(12) United States Patent
Ohnishi et al.

(10) Patent No.: US 10,220,512 B2
(45) Date of Patent: Mar. 5, 2019

(54) POSITION/FORCE CONTROLLER, AND POSITION/FORCE CONTROL METHOD AND PROGRAM

(71) Applicant: KEIO UNIVERSITY, Minato-ku, Tokyo (JP)

(72) Inventors: Kouhei Ohnishi, Kanagawa (JP); Sho Sakaino, Saitama (JP); Takahiro Nozaki, Kanagawa (JP)

(73) Assignee: KEIO UNIVERSITY, Tokyo (JP)

( * ) Notice: Subject to any disclaimer, the term of this patent is extended or adjusted under 35 U.S.C. 154(b) by 183 days.

(21) Appl. No.: 15/022,878

(22) PCT Filed: Sep. 2, 2014

(86) PCT No.: PCT/JP2014/073083
§ 371 (c)(1),
(2) Date: Mar. 17, 2016

(87) PCT Pub. No.: WO2015/041046
PCT Pub. Date: Mar. 26, 2015

(65) Prior Publication Data
US 2016/0207196 A1 Jul. 21, 2016

(30) Foreign Application Priority Data
Sep. 19, 2013 (JP) .................. 2013-194704

(51) Int. Cl.
*B25J 13/02* (2006.01)
*B25J 9/16* (2006.01)
*B25J 3/04* (2006.01)

(52) U.S. Cl.
CPC .............. *B25J 9/1633* (2013.01); *B25J 3/04* (2013.01); *B25J 9/1612* (2013.01); *B25J 9/1656* (2013.01);
(Continued)

(58) Field of Classification Search
CPC ........... B25J 3/04; B25J 9/1633; B25J 9/1653
(Continued)

(56) References Cited
U.S. PATENT DOCUMENTS 5,018,922 A 5/1991 Yoshinada et al.
6,216,056 B1* 4/2001 Ito .............................. B25J 9/16
700/157
(Continued)

FOREIGN PATENT DOCUMENTS

EP 0573657 A1 12/1993
JP 05150826 A 6/1993
(Continued)

OTHER PUBLICATIONS

International Search Report (ISR) dated Dec. 9, 2014 issued in International Application No. PCT/JP2014/073083.
(Continued)

*Primary Examiner* — Leslie A Nicholson, III
(74) *Attorney, Agent, or Firm* — Holtz, Holtz & Volek PC

(57) ABSTRACT

A position/force controller performs: detecting information relating to a position based on the effect of an actuator; converting by distributing control energy to speed or positional energy and force energy in response to functions realized on the basis of speed (position) and force information corresponding to the information relating to the position and on the basis of information serving as a reference for control; calculating the control amount for speed or position on the basis of the speed or positional energy; calculating the force control amount on the basis of the force energy; and integrating the speed or position control amount and the force control amount and performing a reverse conversion on the speed or position control amount and the force control amount to return the output to the actuator, to determine the input to the actuator.

12 Claims, 24 Drawing Sheets

(52) U.S. Cl.
CPC ..... *B25J 13/02* (2013.01); *G05B 2219/35464* (2013.01); *G05B 2219/39546* (2013.01); *G05B 2219/40122* (2013.01); *G05B 2219/40391* (2013.01)

(58) Field of Classification Search
USPC ................................ 700/257, 260, 261, 264
See application file for complete search history.

(56) References Cited

U.S. PATENT DOCUMENTS

| | | | |
|---|---|---|---|
| 6,243,624 B1 * | 6/2001 | Wu ........................ | B25J 9/1605 318/561 |
| 7,672,741 B2 * | 3/2010 | Ohnishi ................ | G05B 19/19 700/19 |
| 9,233,467 B2 * | 1/2016 | Tsusaka .................... | B25J 3/04 |
| 2007/0112466 A1 | 5/2007 | Ohnishi et al. | |

FOREIGN PATENT DOCUMENTS

| | | |
|---|---|---|
| JP | 07295650 A | 11/1995 |
| JP | 10309684 A | 11/1998 |
| JP | 2009279699 A | 12/2009 |
| WO | 9311477 A1 | 6/1993 |
| WO | 2005109139 A1 | 11/2005 |

OTHER PUBLICATIONS

Extended European Search Report (EESR) dated Dec. 7, 2017 issued in counterpart European Application No. 14846664.2.
Ismet, et al., "Parallel Position/Force Controller for Teleoperation Systems", The 5th IFAC Workshop on Technology Transfer in Developing Countries: Automation in Infrastructure Creation, DECOM-TT, May 17, 2007, pp. 291-296, XP055309786.
Raibert, et al., "Hybrid Position/Force Control of Manipulators", Journal of Dynamic Systems, Measurement and Control, vol. 103, No. 2, Jun. 1, 1981, pp. 126-133, XP055309892, US.

* cited by examiner

FIG. 12A

| WIRE | POSITIONS | | | |
|---|---|---|---|---|
| | t1 | t2 | t3 | ... |
| W1 | p1 | p2 | p3 | ... |
| W2 | : | : | : | ... |
| W3 | : | : | : | ... |
| W4 | : | : | : | ... |

FIG. 12B

| VALUE | COORDINATE CONVERSION RESULTS | | | |
|---|---|---|---|---|
| | t1 | t2 | t3 | ... |
| $x''_{a1}$ | q1 | q2 | q3 | ... |
| $x''_{a2}$ | : | : | : | ... |
| $x''_{a3}$ | : | : | : | ... |
| $x''_{\tau 1}$ | : | : | : | ... |
| $x''_{\tau 2}$ | : | : | : | ... |
| $x''_{\tau 3}$ | : | : | : | ... |
| $x''_{t1}$ | : | : | : | ... |
| $x''_{t2}$ | : | : | : | ... |

FIG. 18B
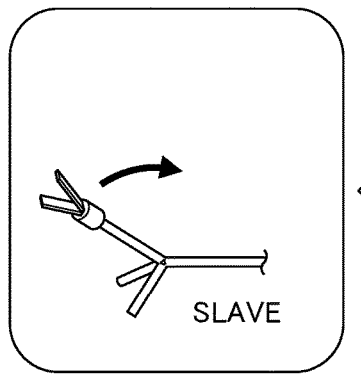
FIG. 18A
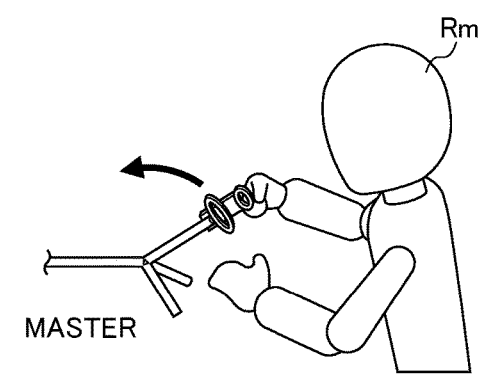
MIRROR CONVERSION
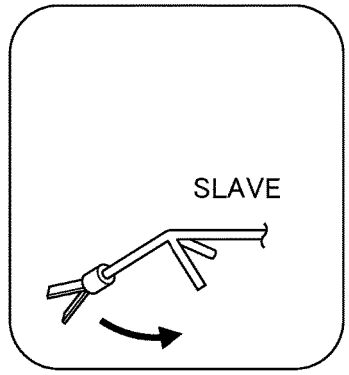
FIG. 18C
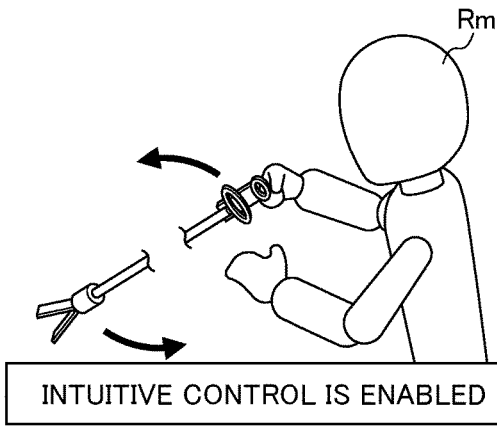
INTUITIVE CONTROL IS ENABLED
FIG. 18D

US 10,220,512 B2

POSITION/FORCE CONTROLLER, AND POSITION/FORCE CONTROL METHOD AND PROGRAM

TECHNICAL FIELD

The present invention relates to a position/force controller that controls positions and forces of a control object, and to a position/force control method and storage medium.

BACKGROUND ART

Heretofore, in the context of an ageing society and suchlike, there have been strong calls to replace humans with robots for tasks that take time and effort.

However, operations of conventional robots are lacking in environmental adaptability and flexibility; human-like movements have not yet been appropriately realized.

Efforts have been made to use time-series position information and force information acquired by a master/slave system to artificially reproduce the movements of actuators.

However, mechanical impedance is always constant during these reproductions; as yet, adaptability to environmental changes such as positions in an environment, sizes and mechanical impedances has been lacking.

Techniques relating to robots that perform remote control through master/slave systems are recited in, for example, Patent Document 1 and Patent Document 2.

Patent Document 1: PCT International Publication No. WO2005/109139

Patent Document 2: Japanese Unexamined Patent Application, Publication No. 2009-279699

DISCLOSURE OF THE INVENTION

Both a high level of environmental adaptability through high-precision force control and sampling of movements in a human coordinate system by a system with many degrees of freedom are extremely important for realizing the replacement of humans with robots for tasks that take time and effort.

This has not yet been realized by conventional techniques.

In other words, conventional techniques have scope for improvement in regard to appropriately realizing human-like movements by a robot.

Means for Solving the Problems

A position/force controller according to an aspect of the present invention includes:

a position detector that detects information relating to a position based on an action of an actuator;

a function-dependent force/speed distribution converter that, on the basis of speed or position information and force information corresponding to the information relating to the position and on the basis of information serving as a reference for control, performs a conversion to distribute control energy to speed or position energy and force energy in accordance with a function that is being realized;

a position control amount calculator that calculates a speed or position control amount on the basis of the speed or position energy distributed by the function-dependent force/speed distribution converter;

a force control amount calculator that calculates a force control amount on the basis of the force energy distributed by the function-dependent force/speed distribution converter;

an integrator that integrates the speed or position control amount with the force control amount and, in order to return an output of the integration to the actuator, performs a reverse conversion on the speed or position control amount and the force control amount and determines an input to the actuator, wherein the speed or position energy and the force energy can be respectively separately controlled.

Effects of the Invention

According to the present invention, a technique for more appropriately realizing human-like movements by a robot may be provided.

BRIEF DESCRIPTION OF THE DRAWINGS

FIG. 12A shows a case in which a time series of positions of the wires W1 to W4 is stored.

FIG. 12B shows a case in which coordinate conversion results according to Expression (4) are stored.

FIGS. 18A to 18D are schematic diagrams showing a situation in which the present invention is applied to surgical forceps.

PREFERRED MODE FOR CARRYING OUT THE INVENTION

Herebelow, an embodiment of the present invention is described with reference to the attached drawings.

First, a basic principle employed in the position/force controller, position/force control method and program according to the present invention is described.

Human-like movements are constituted by the particular functioning of individual joints and the like separately or in combination.

Accordingly, the term "movement" as used in the present embodiment herebelow refers to an integrated function in which the particular "functions" of portions of the human body are realized as constituent elements. For example, a movement associated with flexing and extension of a middle finger (a movement to turn a bolt or the like) is an integrated function in which the functions of respective joints of the middle finger are constituent elements.

(Basic Principle)

The basic principle of the present invention is that any movement can be mathematically represented by three elements: a force origin, a speed (or position) origin and a conversion representing the movement. Therefore, by control energy from an ideal force origin and an ideal speed (position) origin, which have a duality relationship, being supplied to a control object system in accordance with a set of variables defined by a conversion and a reverse conversion, a sampled human body movement may be constituted, reconstructed and/or amplified to reversibly and automatically realize (reproduce) the body movement.

Figure 1:
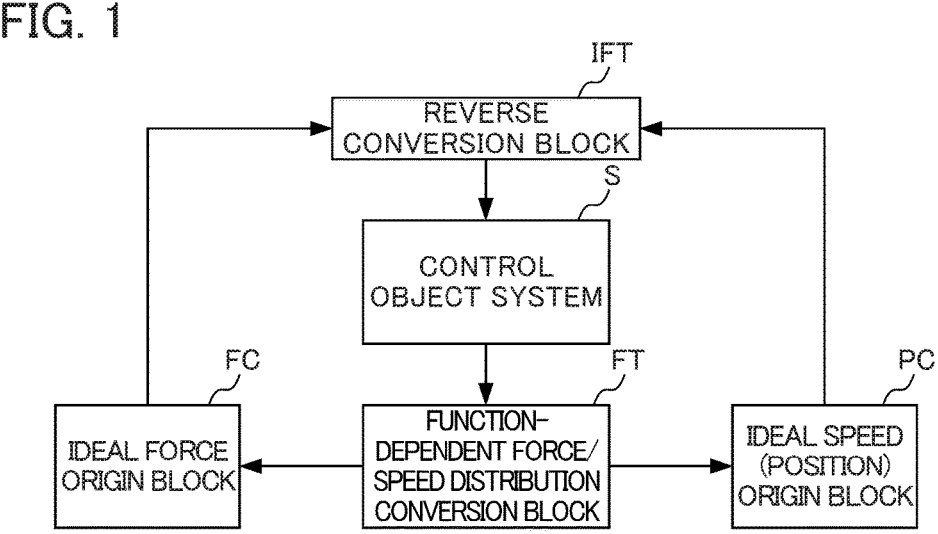
FIG. 1 is a schematic diagram showing an overview of a basic principle relating to the present invention.

FIG. 1 is a schematic diagram showing an overview of the basic principle relating to the present invention.

The basic principle as shown in FIG. 1 represents control rules of an actuator that can be used for realizing human-like movements. An operation of the actuator may be determined by performing computations in at least one of a position (or speed) domain and a force domain, using a current position of the actuator as an input.

That is, the basic principle of the present invention is represented as control rules including a control object system S, a function-dependent force/speed distribution conversion block FT, at least one of an ideal force origin block FC and an ideal speed (position) origin block PC, and a reverse conversion block IFT.

The control object system S is a robot that operates through an actuator/actuators. The control object system S controls each actuator on the basis of acceleration or the like. The control object system S realizes functions of one or plural portions of a human body. Provided the control object system S employs control rules for realizing these functions, the concrete structure of the control object system S does not necessarily need to be in a form that resembles the human body. For example, the control object system S may be a robot that moves a link in a one-dimensional sliding operation with an actuator.

The function-dependent force/speed distribution conversion block FT is a block that defines a conversion of control energy in the speed (position) and force domains, which is specified in accordance with a function of the control object system S. Specifically, the function-dependent force/speed distribution conversion block FT defines a coordinate conversion whose inputs are a value serving as a reference for the function of the control object system S (a reference value) and the current position of an actuator. The coordinate conversion is, generally speaking, a conversion of an input vector whose elements are a reference value of speed (position) and a current speed (position) to an output vector constituted with a speed (position) for calculating a control target value of speed (position), and a conversion of an input vector whose elements are a reference value of force and a current force to an output vector constituted with a force for calculating a control target value of force. To be specific, the coordinate conversion by the function-dependent force/speed distribution conversion block FT can be generalized and expressed as in the following Expressions (1) and (2).

$$\begin{pmatrix} x'_1 \\ x'_2 \\ \vdots \\ x'_{n-1} \\ x'_n \end{pmatrix} = \begin{pmatrix} h_{1a} & h_{1b} & \cdots & h_{1(m-1)} & h_{1m} \\ h_{2a} & h_{2b} & \cdots & h_{2(m-1)} & h_{2m} \\ \vdots & \vdots & \ddots & \vdots & \vdots \\ h_{(n-1)a} & h_{(n-1)b} & \cdots & h_{(n-1)(m-1)} & h_{(n-1)m} \\ h_{na} & h_{nb} & \cdots & h_{n(m-1)} & h_{nm} \end{pmatrix} \begin{pmatrix} x'_a \\ x'_b \\ \vdots \\ x'_{m-1} \\ x'_m \end{pmatrix} \quad (1)$$

$$\begin{pmatrix} f''_1 \\ f''_2 \\ \vdots \\ f''_{n-1} \\ f''_n \end{pmatrix} = \begin{pmatrix} h_{1a} & h_{1b} & \cdots & h_{1(m-1)} & h_{1m} \\ h_{2a} & h_{2b} & \cdots & h_{2(m-1)} & h_{2m} \\ \vdots & \vdots & \ddots & \vdots & \vdots \\ h_{(n-1)a} & h_{(n-1)b} & \cdots & h_{(n-1)(m-1)} & h_{(n-1)m} \\ h_{na} & h_{nb} & \cdots & h_{n(m-1)} & h_{nm} \end{pmatrix} \begin{pmatrix} f''_a \\ f''_b \\ \vdots \\ f''_{m-1} \\ f''_m \end{pmatrix} \quad (2)$$

In Expression (1), $x'_1$ to $x'_n$ (n is an integer that is at least 1) represent speed vectors for calculating a state value of speed, $x'_a$ to $x'_m$ (m is an integer that is at least 1) represent vectors whose elements are a reference value and a speed based on an action of the actuator (a speed of a moving element of the actuator or a speed of an object being moved by the actuator), and $h_{1a}$ to $h_{nm}$ represent elements of a conversion matrix representing the function. In Expression (2), $f''_1$ to $f''_n$ (n is an integer that is at least 1) represent force vectors for calculating a state value of force, and $f''_a$ to $f''_m$ (m is an integer that is at least 1) represent vectors whose elements are a reference value and a force based on an action of the actuator (a force of a moving element of the actuator or a force of the object being moved by the actuator).

By the coordinate conversion by the function-dependent force/speed distribution conversion block FT being specified in accordance with the function to be realized, various movements may be realized and movements may be reproduced with scaling.

That is, in the basic principle of the present invention, the function-dependent force/speed distribution conversion block FT "converts" a variable of an actuator unit (a variable in real space) to a set of variables (variables in virtual space) for the whole system representing the function to be realized, and distributes control energy to speed (position) control energy and force control energy. Therefore, in contrast to a case in which control is performed using unmodified variables of actuator units (variables in real space), the speed (position) control energy and force control energy may be given separately.

The ideal force origin block FC is a block that performs computations in the force domain in accordance with the coordinate conversion defined by the function-dependent force/speed distribution conversion block FT. The ideal force origin block FC sets a target value relating to force in performing a computation on the basis of the coordinate conversion defined by the function-dependent force/speed distribution conversion block FT. The target value is set as a fixed value or a variable value, depending on the function being realized. For example, if the function being realized is the same as the function represented by the reference value, the target value is set to zero, and if scaling is to be applied, information representing the function being reproduced is set to a magnified or reduced value.

The ideal speed (position) origin block PC is a block that performs computations in the speed (position) domain in accordance with the coordinate conversion defined by the function-dependent force/speed distribution conversion block FT. The ideal speed (position) origin block PC sets a target value relating to speed (position) in performing a computation on the basis of the coordinate conversion defined by the function-dependent force/speed distribution conversion block FT. The target value is set as a fixed value or a variable value, depending on the function being realized. For example, if the function being realized is the same as the function represented by the reference value, the target value is set to zero, and if scaling is to be applied, information representing the function being reproduced is set to a magnified or reduced value.

The reverse conversion block IFT is a block that converts values in the speed (position) and force domains to values in an input domain for the control object system S (for example, voltage values, current values or the like).

According to the basic principle, when position information of an actuator of the control object system S is inputted to the function-dependent force/speed distribution conversion block FT, the function-dependent force/speed distribution conversion block FT uses speed (position) and force information obtained on the basis of this position information and applies respective control rules according to the function in the position and force domains. A force according to the function is computed at the ideal force origin block FC, a speed (position) according to the function is computed at the ideal speed (position) origin block PC, and control energy is allocated to each of the force and speed (position).

Computation results from the ideal force origin block FC and the ideal speed (position) origin block PC are information representing control targets of the control object system S. These computed values are converted to actuator input values by the reverse conversion block IFT and the actuator input values are inputted to the control object system S.

As a result, the actuator of the control object system S executes an operation corresponding to the function defined by the function-dependent force/speed distribution conversion block FT and the robot operation that is the objective is realized.

Thus, in the present invention, a human-like movement by a robot may be more appropriately realized.

(Defined Function Examples)

Now, specific examples of functions defined by the function-dependent force/speed distribution conversion block FT are described.

The function-dependent force/speed distribution conversion block FT defines a coordinate conversion whose objects are a speed (position) and force obtained on the basis of a current position of an actuator (a conversion from real space to a virtual space according to the function being realized).

At the function-dependent force/speed distribution conversion block FT, the inputs are a speed (position) and force derived from the current position and a speed (position) and force that are reference values of the function; the function-dependent force/speed distribution conversion block FT applies the control rules for each of speed (position) and force in terms of accelerations.

That is, a force of the actuator is expressed as the product of mass and acceleration, and a speed (position) of the actuator is expressed by integrating acceleration. Therefore, the current position of the actuator may be acquired and the function that is the objective may be realized by controlling speeds (positions) and forces via the acceleration domain.

Herebelow, concrete examples of various functions are described.

(Force-Sense Transmission Function)

Figure 2:
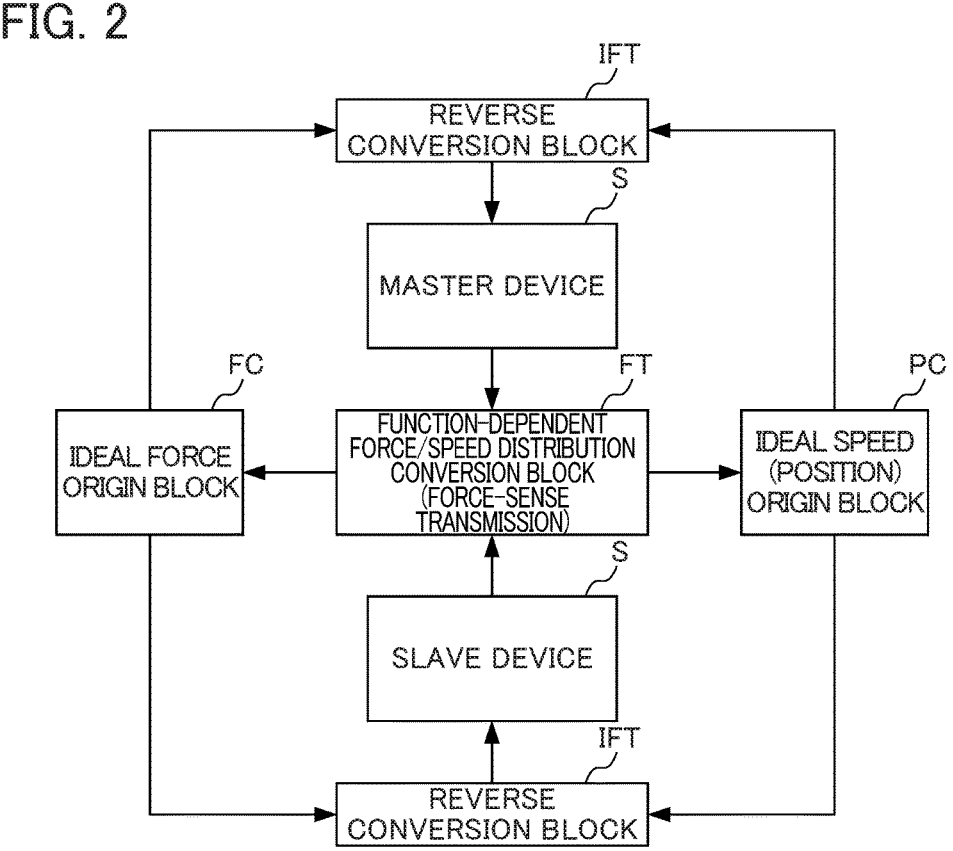
FIG. 2 is a schematic diagram showing an overview of control when a force-sense transmission function is defined at a function-dependent force/speed distribution conversion block FT.
Figure 3:
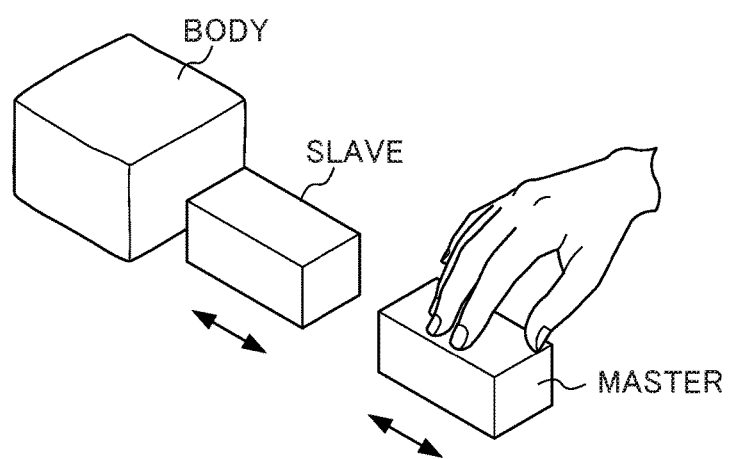
FIG. 3 is a schematic diagram showing an overview of a master/slave system that includes a master device and a slave device at which the force-sense transmission function is employed.

FIG. 2 is a schematic diagram showing an overview of control when a force-sense transmission function is defined at the function-dependent force/speed distribution conversion block FT. FIG. 3 is a schematic diagram showing an overview of a master/slave system that includes a master device and a slave device at which the force-sense transmission function is employed.

As shown in FIG. 2, a function that transfers an operation of the master device to the slave device and that feeds back to the master device a reaction force from a body against the slave device (a bilateral control function) may be realized as the function defined by the function-dependent force/speed distribution conversion block FT.

In this case, the coordinate conversion by the function-dependent force/speed distribution conversion block FT can be expressed as in the following Expressions (3) and (4).

$$\begin{pmatrix} \dot{x}_p \\ \dot{x}_f \end{pmatrix} = \begin{pmatrix} 1 & -1 \\ 1 & 1 \end{pmatrix} \begin{pmatrix} \dot{x}_m \\ \dot{x}_s \end{pmatrix} \quad (3)$$

$$\begin{pmatrix} f_p \\ f_f \end{pmatrix} = \begin{pmatrix} 1 & -1 \\ 1 & 1 \end{pmatrix} \begin{pmatrix} f_m \\ f_s \end{pmatrix} \quad (4)$$

In Expression (3), $\dot{x}'_p$ represents a speed for calculating a state value of speed (position) and $\dot{x}'_f$ represents a speed relating to a state value of force. Further, $\dot{x}'_m$ represents a reference value (of an input from the master device) of speed (a differential value of the current position of the master device) and $\dot{x}'_s$ represents a current speed (a differential value of the current position) of the slave device. In expression (4), $f_p$ represents a force relating to the state value of speed (position) and $f_f$ represents a force for calculating the state value of force. Further, $f_m$ represents a reference value (of an input from the master device) of force and $f_s$ represents a current force of the slave device.

(Pick and Place Function)

Figure 4:
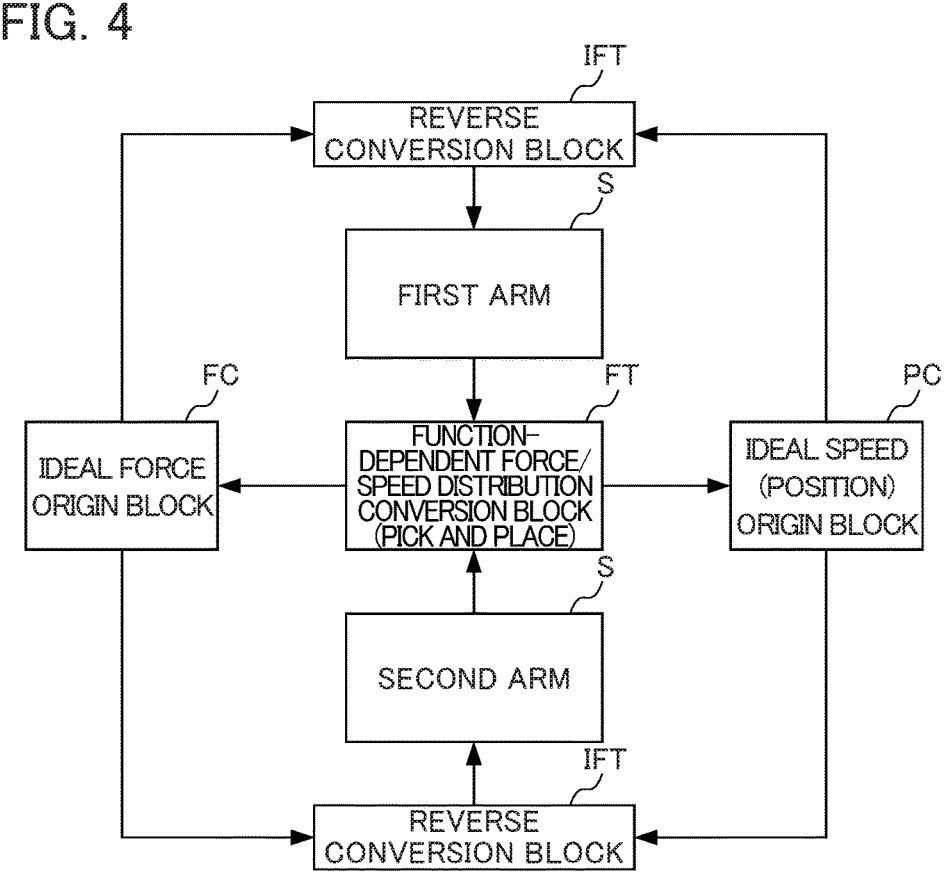
FIG. 4 is a schematic diagram showing an overview of control when a pick and place function is defined at the function-dependent force/speed distribution conversion block FT.
Figure 5:
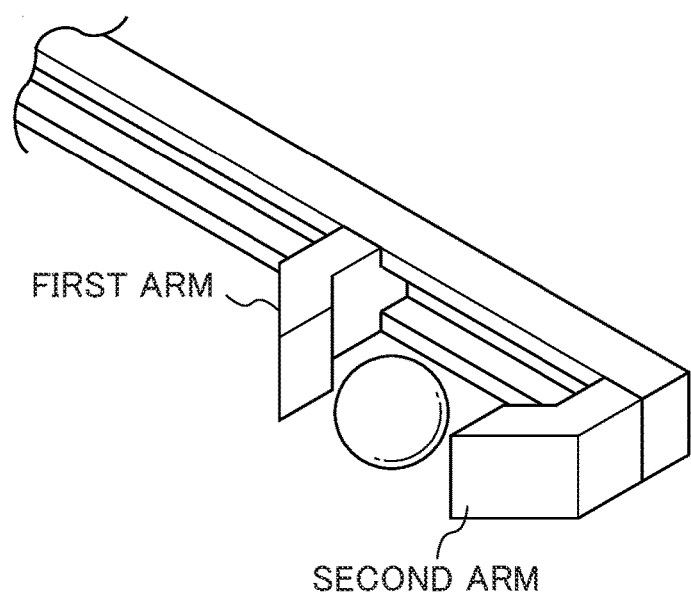
FIG. 5 is a schematic diagram showing an overview of a robot arm system including a first arm and a second arm at which the pick and place function is employed.

FIG. 4 is a schematic diagram showing an overview of control when the pick and place function is defined at the function-dependent force/speed distribution conversion block FT. FIG. 5 is a schematic diagram showing an overview of a robot arm system including a first arm and a second arm at which the pick and place function is employed.

As shown in FIG. 4, a function to grip (pick) a body such as a workpiece or the like, convey it to a target position, and release (place) it may be realized as a function (the pick and place function) defined by the function-dependent force/speed distribution conversion block FT.

In this case, the coordinate conversion by the function-dependent force/speed distribution conversion block FT can be expressed as in the following Expressions (5) and (6).

$$\begin{pmatrix} \dot{x}_{mani} \\ \dot{x}_{grasp} \end{pmatrix} = \begin{pmatrix} 1 & 1 \\ 1 & -1 \end{pmatrix} \begin{pmatrix} \dot{x}_1 \\ \dot{x}_2 \end{pmatrix} \quad (5)$$

$$\begin{pmatrix} f_{mani} \\ f_{grasp} \end{pmatrix} = \begin{pmatrix} 1 & 1 \\ 1 & -1 \end{pmatrix} \begin{pmatrix} f_1 \\ f_2 \end{pmatrix} \quad (6)$$

In Expression (5), $\dot{x}'_{mani}$ represents a speed for calculating a state value of speed (position) and $\dot{x}'_{grasp}$ represents a speed relating to a state value of force. Further, $\dot{x}'_1$ represents a speed (a differential of the current position) of the first arm and $\dot{x}'_2$ represents a speed (differential value of the current position) of the second arm. In Expression (6), $f_{mani}$ represents a force relating to a state value of speed (position) and $f_{grasp}$ represents a force for calculating a state value of force. Further, $f_1$ represents a reaction force that the first arm receives from the body and $f_2$ represents a reaction force that the second arm receives from the body.

(Bolt-Turning Learning and Reproduction Function)

Figure 6:
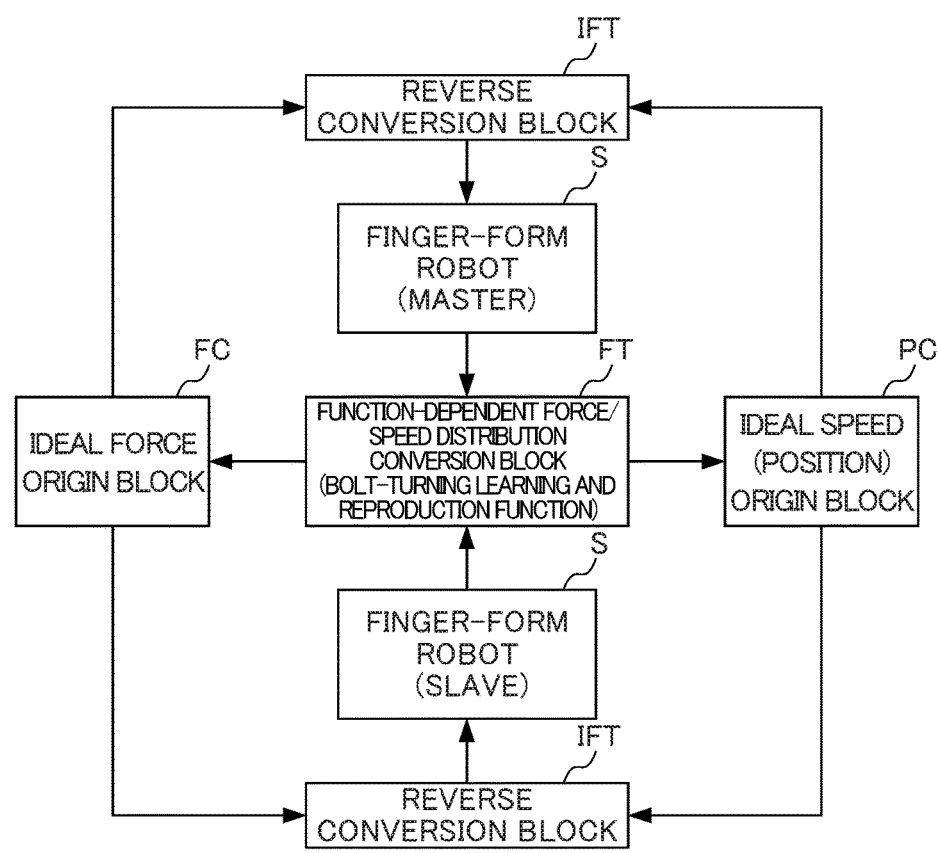
FIG. 6 is a schematic diagram showing an overview of control when a bolt-turning learning and reproduction function is defined at the function-dependent force/speed distribution conversion block FT.
Figure 7A:
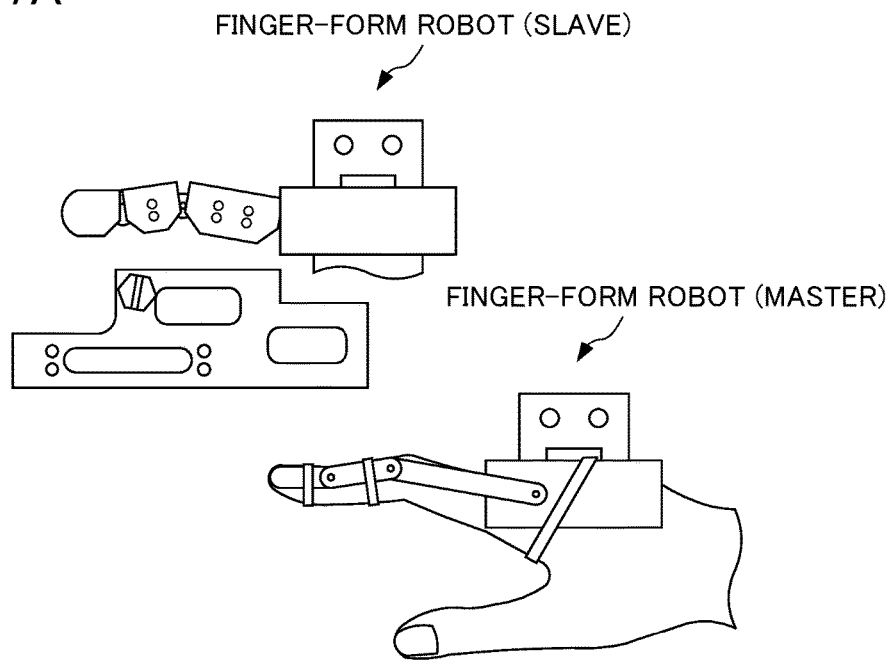
FIG. 7A is a schematic diagram showing an overview of a master/slave system including a master finger-form robot and a slave finger-form robot at which the bolt-turning learning and reproduction function is employed.
Figure 7B:
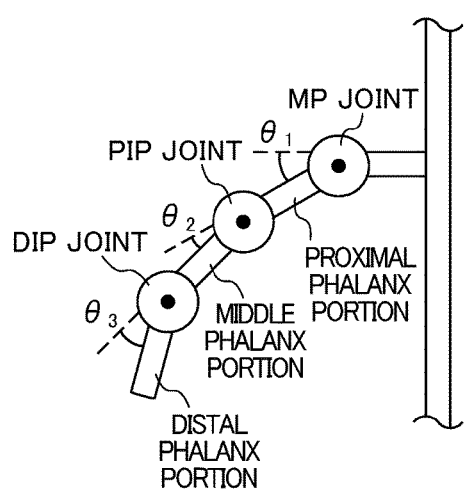
FIG. 7B is a schematic diagram showing a finger mechanism of the finger-form robots.

FIG. 6 is a schematic diagram showing an overview of control when a bolt-turning learning and reproduction function is defined at the function-dependent force/speed distribution conversion block FT. FIG. 7A and FIG. 7B are schematic diagrams showing a robot at which the bolt-turning learning and reproduction function is employed. FIG. 7A is a schematic diagram showing an overview of a master/slave system including a master finger-form robot and a slave finger-form robot at which the bolt-turning learning and reproduction function is employed. FIG. 7B is a schematic diagram showing a finger mechanism of the finger-form robots.

As shown in FIG. 6, the bolt-turning learning and reproduction function that fastens a bolt by flexing and extending a finger may be realized as a function defined by the function-dependent force/speed distribution conversion block FT.

In this case, the coordinate conversion by the function-dependent force/speed distribution conversion block FT can be expressed as in the following Expressions (7) and (8).

$$\begin{pmatrix} \dot{x}_{a1} \\ \dot{x}_{a2} \\ \dot{x}_{a3} \\ \dot{x}_{\tau 1} \\ \dot{x}_{\tau 2} \\ \dot{x}_{\tau 3} \\ \dot{x}_{t1} \\ \dot{x}_{t2} \end{pmatrix} = \begin{pmatrix} \frac{2}{11} & \frac{2}{11} & \frac{4}{11} & \frac{-3}{11} & \frac{-3}{11} & \frac{4}{11} & \frac{2}{11} & \frac{2}{11} \\ \frac{3}{11} & \frac{3}{11} & \frac{-5}{11} & \frac{1}{11} & \frac{1}{11} & \frac{-5}{11} & \frac{3}{11} & \frac{3}{11} \\ \frac{1}{11} & \frac{-1}{11} & 0 & 0 & 0 & 0 & \frac{-1}{11} & \frac{1}{11} \\ \frac{1}{2} & \frac{-1}{2} & 0 & 0 & 0 & 0 & \frac{-1}{2} & \frac{1}{2} \\ 1 & 1 & 1 & -1 & 1 & -1 & -1 & -1 \\ 1 & 1 & -1 & 0 & 0 & 1 & -1 & -1 \\ 1 & -1 & 0 & 0 & 0 & 0 & 1 & -1 \\ 1 & 1 & 2 & 4 & 0 & 0 & 0 & 0 \\ 0 & 0 & 0 & 0 & 4 & 2 & 1 & 1 \end{pmatrix} \begin{pmatrix} \dot{x}_1 \\ \dot{x}_2 \\ \dot{x}_3 \\ \dot{x}_4 \\ \dot{x}_5 \\ \dot{x}_6 \\ \dot{x}_7 \\ \dot{x}_8 \end{pmatrix} \quad (7)$$

$$\begin{pmatrix} f_{a1} \\ f_{a2} \\ f_{a3} \\ f_{\tau 1} \\ f_{\tau 2} \\ f_{\tau 3} \\ f_{t1} \\ f_{t2} \end{pmatrix} = \begin{pmatrix} \frac{2}{11} & \frac{2}{11} & \frac{4}{11} & \frac{-3}{11} & \frac{-3}{11} & \frac{4}{11} & \frac{2}{11} & \frac{2}{11} \\ \frac{3}{11} & \frac{3}{11} & \frac{-5}{11} & \frac{1}{11} & \frac{1}{11} & \frac{-5}{11} & \frac{3}{11} & \frac{3}{11} \\ \frac{1}{11} & \frac{-1}{11} & 0 & 0 & 0 & 0 & \frac{-1}{11} & \frac{1}{11} \\ \frac{1}{2} & \frac{-1}{2} & 0 & 0 & 0 & 0 & \frac{-1}{2} & \frac{1}{2} \\ 1 & 1 & 1 & -1 & 1 & -1 & -1 & -1 \\ 1 & 1 & -1 & 0 & 0 & 1 & -1 & -1 \\ 1 & -1 & 0 & 0 & 0 & 0 & 1 & -1 \\ 1 & 1 & 2 & 4 & 0 & 0 & 0 & 0 \\ 0 & 0 & 0 & 0 & 4 & 2 & 1 & 1 \end{pmatrix} \begin{pmatrix} f_1 \\ f_2 \\ f_3 \\ f_4 \\ f_5 \\ f_6 \\ f_7 \\ f_8 \end{pmatrix} \quad (8)$$

In Expression (7), $x'_{a1}$ represents a speed-correspondent value relating to an angle of an MP joint, $x'_{a2}$ represents a speed-correspondent value relating to an angle of a PIP joint, and $x'_{a3}$ represents a speed-correspondent value relating to an angle of a DIP joint. Further, $x'_{\tau 1}$ represents a speed-correspondent value relating to a torque of the MP joint, $x'_{\tau 2}$ represents a speed-correspondent value relating to a torque of the PIP joint, and $x'_{\tau 3}$ represents a speed-correspondent value relating to a torque of the DIP joint. Meanwhile, $x'_{t1}$ represents a speed-correspondent value relating to tension in wires W1 to W4 of the master finger-form robot, x't2 represents a speed-correspondent value relating to tension in wires W5 to W8 of the slave finger-form robot, $x'_1$ to $x'_4$ represent respective speed-correspondent values of the wires W1 to W4 connected to the master finger-form robot, and $x'_5$ to $x'_8$ represent respective speed-correspondent values of the wires W5 to W8 connected to the slave finger-form robot. The angle of the MP joint, angle of the PIP joint and angle of the DIP joint are defined as shown by $\theta_1$ to $\theta_3$ in FIG. 7B. In Expression (8), $f_{a1}$ represents a force-correspondent value relating to the angle of the MP joint, $f_{a2}$ represents a force-correspondent value relating to the angle of the PIP joint, and $f_{a3}$ represents a force-correspondent value relating to the angle of the DIP joint. Further, $f_{\tau 1}$ represents a force-correspondent value relating to the torque of the MP joint, $f_{\tau 2}$ represents a force-correspondent value relating to the torque of the PIP joint, and $f_{\tau 3}$ represents a force-correspondent value relating to the torque of the DIP joint. Meanwhile, ft1 represents a force-correspondent value relating to the tension in wires W1 to W4 of the master finger-form robot, $f_{t2}$ represents a force-correspondent value relating to the tension in wires W5 to W8 of the slave finger-form robot, $f_1$ to $f_4$ represent respective force-correspondent values of the wires W1 to W4 connected to the master finger-form robot, and $f_5$ to $f_8$ represent respective force-correspondent values of the wires W5 to W8 connected to the slave finger-form robot.

(Basic Structure of the Position/Force Controller)

Now, basic structure of the position/force controller 1 employing the basic principle of the present invention is described.

Figure 8:
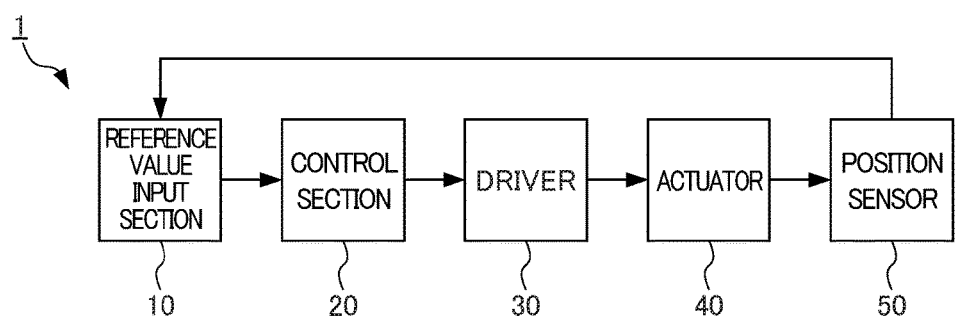
FIG. 8 is a schematic diagram showing basic structure of a position/force controller 1 in accordance with the present invention.

FIG. 8 is a schematic diagram showing the basic structure of the position/force controller 1 in accordance with the present invention.

In FIG. 8, the structure of the position/force controller 1 includes a reference value input section 10, a control section 20, a driver 30, an actuator 40 and a position sensor 50.

The position/force controller 1 operates as a slave device in response to operations of a master device, which is not shown in FIG. 8. The position/force controller 1 inputs detection results of a position sensor disposed at an actuator of the master device and operates in accordance with a function.

A function with which the position/force controller 1 is equipped may be variously changed by replacing a coordinate conversion defined by the function-dependent force/speed distribution conversion block FT in the control section 20, as described below.

The reference value input section 10 inputs to the control section 20 values to serve as reference values for each function (reference values) that are provided to the position/force controller 1. For example, the reference values are a time series of detection values outputted by a position sensor disposed at the actuator of the master device If the time series of detection values is to be inputted to the control section 20 as reference values from the master device in real time, the reference value input section 10 may be structured by a communications interface (communications I/F). Alternatively, if the time series of detection values from the master device is stored in advance, sequentially read out and inputted to the control section 20 as reference values, the reference value input section 10 may be structured by a storage device such as memory, a hard disc or the like.

The control section 20 performs overall control of the position/force controller 1 and is structured by an information processing device such as a central processing unit (CPU) or the like.

The control section 20 is equipped with the functions of the function-dependent force/speed distribution conversion block FT, the ideal force origin block FC, the ideal speed (position) origin block PC and the reverse conversion block IFT shown in FIG. 1.

That is, the control section 20 inputs the time series of detection values detected by the position sensor of the master device via the reference value input section 10. This time series of detection values expresses operations of the master device. The control section 20 applies the coordinate conversion specified in accordance with the function to information on speeds (positions) and forces calculated from the inputted detection values (positions).

The control section 20 performs computations in the speed (position) domain on the speeds (positions) for calculating the state value of speed (position) provided by the coordinate conversion. Similarly, the control section 20 performs computations in the force domain on the forces for calculating the state value of force provided by the coordinate conversion. The control section 20 applies dimension standardization processing, to accelerations or the like, to the calculated computation results in the speed (position) domain and computation results in the force domain. The control section 20 then applies a reverse conversion of the coordinate conversion specified in accordance with the function. Thus, the control section 20 converts the calculated computation results in the speed (position) domain and computation results in the force domain to values in a domain of inputs to the actuator.

The driver 30 converts the values in the domain of inputs to the actuator, to which the reverse conversion has been performed by the control section 20, to specific control command values for the actuator 40 (voltage values, current values or the like), and outputs these control command values to the actuator 40.

The actuator 40 performs driving in response to the control command values inputted from the driver 30, thus controlling a position of a control object.

The position sensor 50 detects positions of the control object controlled by the actuator 40 and outputs the detection values to the control section 20.

Thus, the position/force controller 1 with this structure converts speeds (positions) and forces obtained from the positions of the control object detected by the position sensor 50 to state values in the speed (position) domain and the force domain by the coordinate conversion corresponding to the function. Hence, control energy is distributed to each of speed (position) and force in accordance with the function. Then, the reverse conversion is performed on the respective state values to find control command values, and the actuator 40 is driven by the driver 30 in response to these control command values.

Thus, by detecting positions of the control object, the position/force controller 1 may calculate the state values of speed (position) and force that are necessary for realizing the function that is the objective, and by driving the actuator 40 on the basis of these state values, the position/force controller 1 may control the position and force of the control object into a state that is an objective.

Moreover, by replacing the coordinate conversion corresponding to a function in the control section 20, the position/force controller 1 may realize different functions. For example, various functions may be realized by the position/force controller 1, by coordinate conversions corresponding to plural functions being stored in accordance with the respective functions in a storage device provided at the position/force controller 1 and the coordinate conversion corresponding to one of the functions being selected in accordance with an objective.

The position/force controller 1 may use reference values inputted to the control section 20 and acquired values of position and force that are inputted in real time from a master device. In this case, the position/force controller 1 may be controlled in conjunction with operations of the master device in real time.

Alternatively, the position/force controller 1 may use reference values inputted to the control section 20 and acquired values of time series of position and force of a master device or a slave device that have been acquired and stored in advance. In this case, the position/force controller 1 may use operations of the master device prepared beforehand as reference values to realize the function. In other words, the position/force controller 1 may reproduce a function that is an objective in a situation in which the master device is not present.

(A Concrete Example of the Position/Force Controller 1)

Now, a concrete structural example of the position/force controller 1 is described.

As described above, the position/force controller 1 may realize various functions by replacing coordinate conversions in accordance with functions defined by the control section 20.

Below, a structural example of the position/force controller 1 is described for cases of realizing the force-sense transmission function according to FIG. 2, the pick and place function according to FIG. 4, and the bolt-turning learning and reproduction function according to FIG. 6.

(Structural Example of the Position/Force Controller 1 Realizing the Force-Sense Transmission Function)

Figure 9:
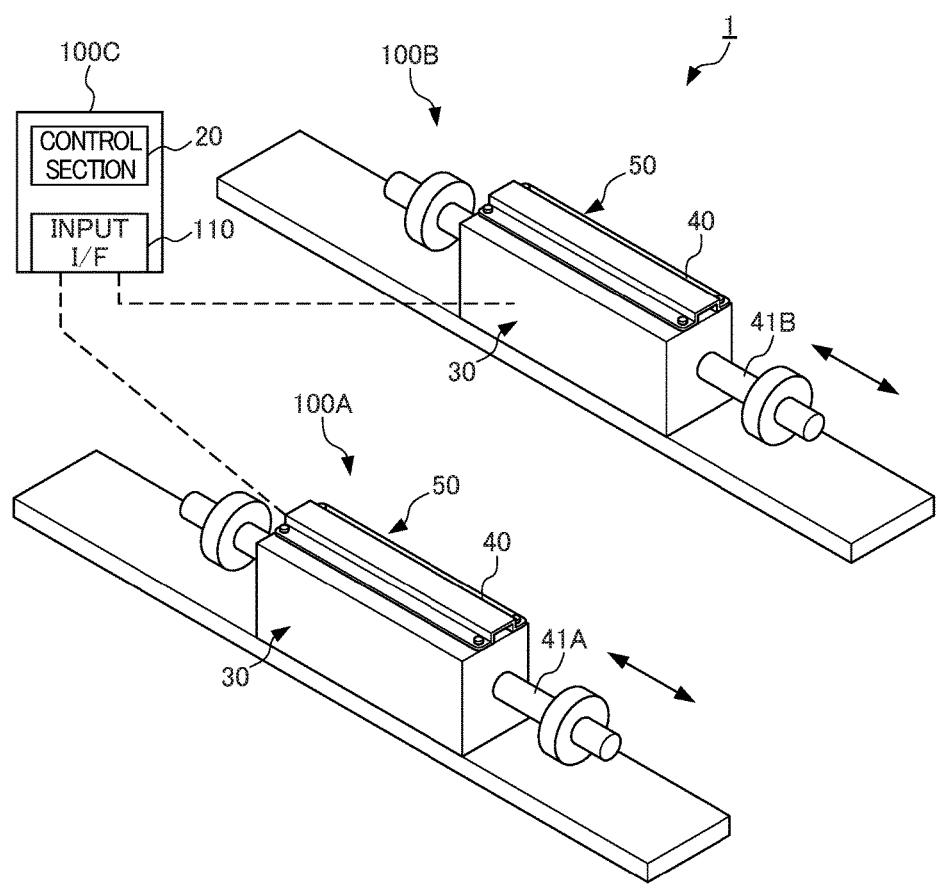
FIG. 9 is a schematic diagram showing structures of the position/force controller 1 that realize the force-sense transmission function.

FIG. 9 is a schematic diagram showing structures of the position/force controller 1 that realize the force-sense transmission function.

The structure of the position/force controller 1 in FIG. 9 includes a master device 100A, a slave device 100B and a personal computer (PC) 100C.

The master device 100A is structured by the actuator 40, incorporating the driver 30 and the position sensor 50.

The master device 100A is equipped with a movable shaft 41A that is slidable in one direction. The movable shaft 41A is moved by an operator. Positions of the movable shaft 41A are detected by the position sensor 50 and the detection values are outputted to the PC 100C.

The actuator 40 of the master device 100A is controlled by the PC 100C. The position/force controller 1 according to FIG. 9 is equipped with a bilateral control function. Operations of the actuator 40 of the master device 100A are controlled by the PC 100C in response to forces with which the slave device 100B touches against a body.

Similarly to the master device 100A, the slave device 100B is structured by another of the actuator 40, incorporating others of the driver 30 and the position sensor 50.

The slave device 100B is equipped with a movable shaft 41B that is slidable in one direction. The movable shaft 41B is moved by the actuator 40. Positions of the movable shaft 41B are detected by the position sensor 50 and the detection values are outputted to the PC 100C.

The PC 100C is equipped with a communications interface 110, which includes the functions of the reference value input section 10, and the control section 20.

The communications interface 110 receives detection values of the position sensors 50 that are inputted from the master device 100A and the slave device 100B, and outputs the detection values to the control section 20. The communications interface 110 outputs values of acceleration for controlling the actuators 40 of the master device 100A and the slave device 100B, which are inputted to the communications interface 110 from the control section 20, to the master device 100A and the slave device 100B.

In the case of the position/force controller 1 that realizes the force-sense transmission function, a coordinate conversion expressed as in Expression (2) is defined at the control section 20. Consequently, control is performed to a state in which a difference between a position of the actuator 40 of the master device 100A and a position of the actuator 40 of the slave device 100B is zero. Further, control is performed to a state in which a force that the operator applies to the actuator 40 of the master device 100A and a reaction force from a body acting on the actuator 40 of the slave device 100B have an action-reaction relationship (mutually equal and in opposite directions).

Therefore, controls performed on the master device 100A may be accurately reproduced at the slave device 100B, and reaction forces from bodies inputted to the slave device 100B may be accurately transmitted to the master device 100A.

(Structural Example of the Position/Force Controller 1 Realizing the Pick and Place Function)

Figure 10:
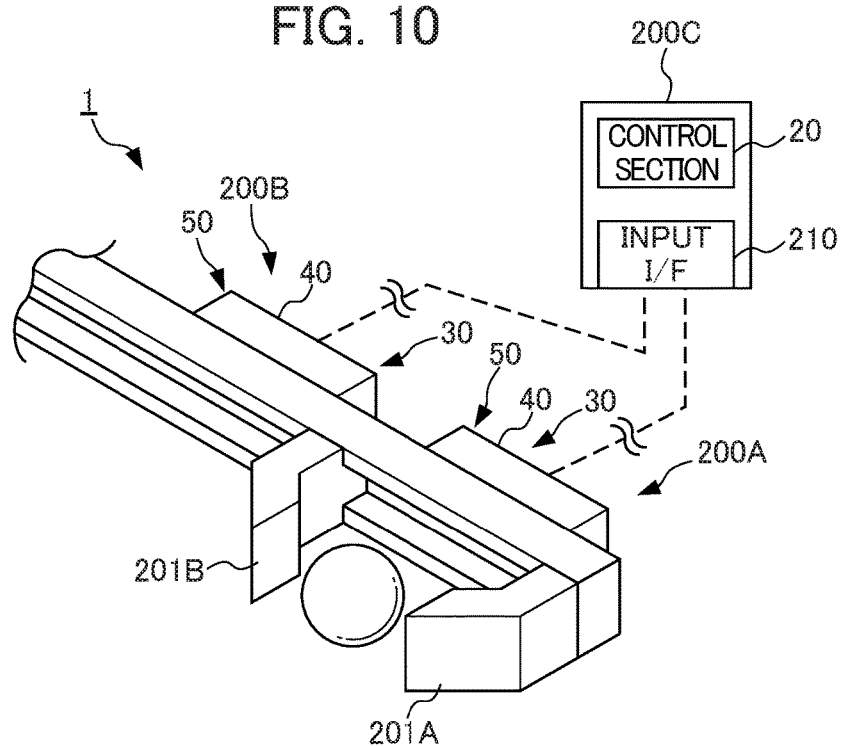
FIG. 10 is a schematic diagram showing structures of the position/force controller 1 that realize the pick and place function.

FIG. 10 is a schematic diagram showing structures of the position/force controller 1 that realize the pick and place function. The structure of the position/force controller 1 in FIG. 10 includes an arm unit 200A structuring a first arm, an arm unit 200B structuring a second arm, and a personal computer (PC) 200C.

The arm unit 200A is structured by an arm portion 201A and the actuator 40, incorporating the driver 30 and the position sensor 50.

The arm unit 200A is equipped with a movable shaft (not shown in the drawing) that is slidable in one direction. The arm portion 201A is fixed to a distal end portion of the movable shaft. Positions of the arm portion 201A (that is, positions of the movable shaft) are detected by the position sensor 50 and the detection values are outputted to the PC 200C.

The actuator 40 of the arm unit 200A is controlled by the PC 200C. Specifically, the arm portion 201A is controlled by the PC 200C so as to abut against an object with a specified force, retain the object together with an arm portion 201B in this state, and move the object.

The arm unit 200B is structured by the arm portion 201B and, similarly to the arm unit 200A, another of the actuator 40, incorporating others of the driver 30 and the position sensor 50.

The PC 200C is equipped with a communications interface 210, which includes the functions of the reference value input section 10, and the control section 20.

The communications interface 210 receives detection values of the position sensors 50 that are inputted from the arm unit 200A and the arm unit 200B, and outputs the detection values to the control section 20. The communications interface 210 outputs values of acceleration for controlling the actuators 40 of the arm unit 200A and the arm unit 200B, which are inputted to the communications interface 210 from the control section 20, to the arm unit 200A and the arm unit 200B.

In the case of the position/force controller 1 that realizes the pick and place transmission function, a coordinate conversion expressed as in Expression (3) is defined at the control section 20. Consequently, control is performed to a state in which a difference between a reaction force vector from a body acting on the actuator 40 of the arm unit 200A and a reaction force vector from the body acting on the actuator 40 of the arm unit 200B, which is to say a gripping force, is at a specified target value. Further, control is performed to a state in which the sum of a position of the arm portion 201A of the arm unit 200A (a displacement of the arm portion 201A from a reference position) and a position of the arm portion 201B of the arm unit 200B (a displacement of the arm portion 201B from a reference position), which is to say the center between the two arms, is at a specified target value.

Thus, operations are performed to move the arm portion 201A of the arm unit 200A and the arm portion 201B of the arm unit 200B toward and away from another, and control is performed to a state in which the arm portion 201A and the arm portion 201B abut against an object with the same force. In this state, the object may be gripped and conveyed to a target position by the arm portion 201A and the arm portion 201B being moved in the same direction.

(Structural Example of the Position/Force Controller 1 Realizing the Bolt-Turning Learning and Reproduction Function)

Figure 11:
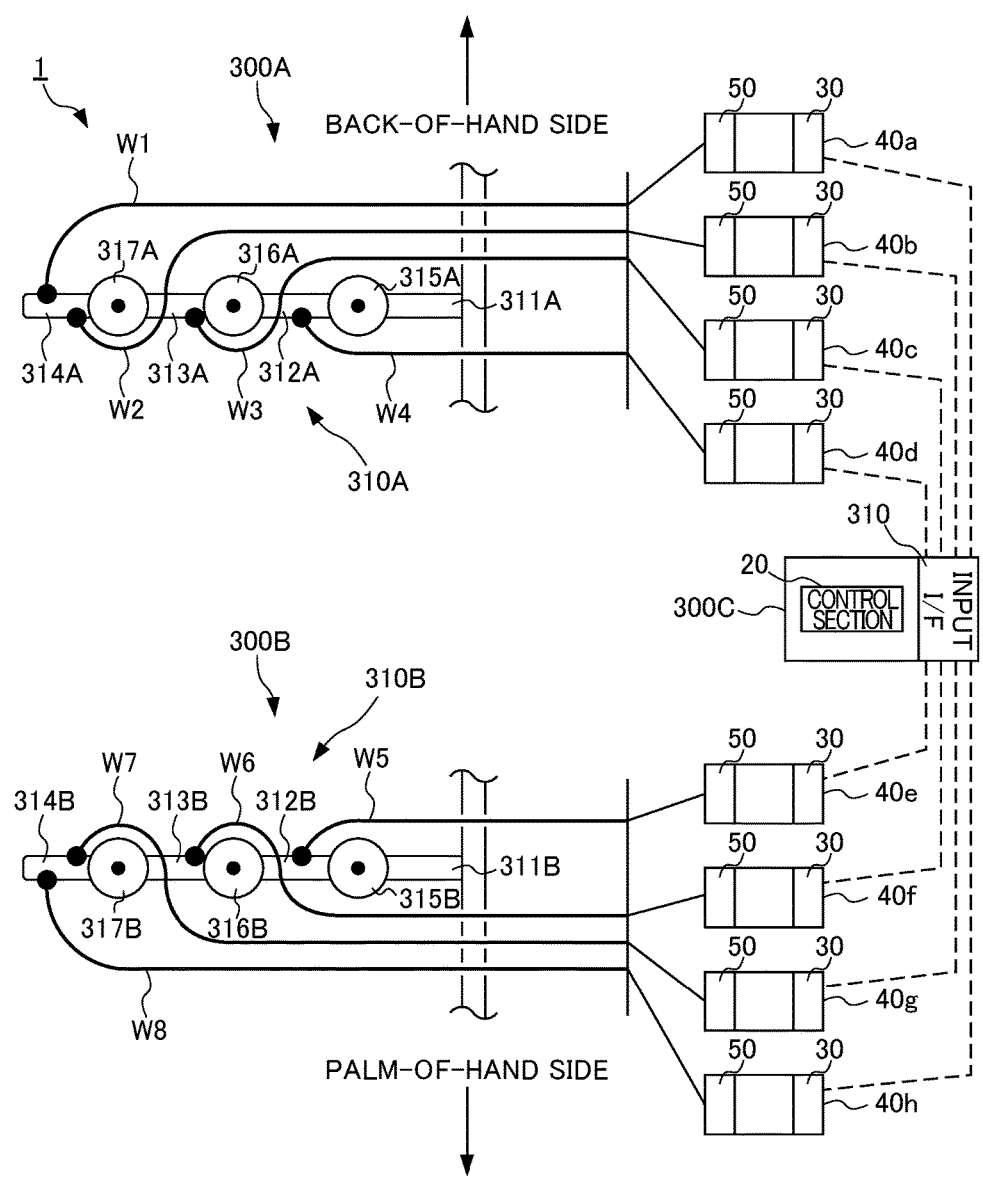
FIG. 11 is a schematic diagram showing structures of the position/force controller 1 that realize the bolt-turning learning and reproduction function.

FIG. 11 is a schematic diagram showing structures of the position/force controller 1 that realize the bolt-turning learning and reproduction function. The structure of the position/force controller 1 in FIG. 11 includes a finger-form robot 300A that serves as a master device, a finger-form robot 300B that serves as a slave device, and a personal computer (PC) 300C.

The finger-form robot 300A is structured by a finger mechanism portion 310A, wires W1 to W4 that are connected to portions of the finger mechanism portion 310A, and actuators 40a to 40d that perform control to pull on the wires W1 to W4.

The finger mechanism portion 310A is equipped with a base portion 311A, which corresponds to a human metacarpal, a proximal phalanx portion 312A corresponding to a proximal phalanx, a middle phalanx portion 313A corresponding to a middle phalanx, a distal phalanx portion 314A corresponding to a distal phalanx, an MP joint portion 315A corresponding to an MP joint, a PIP joint portion 316A corresponding to a PIP joint, and a DIP joint portion 317A corresponding to a DIP joint. One end of the wire W1 is connected to a back-of-hand side of the distal phalanx portion 314A.

The wire W1 passes along the back-of-hand side of the finger mechanism portion 310A, and the other end of the wire W1 is connected to an output shaft of the actuator 40a. Therefore, when the wire W1 is pulled on by the actuator 40a, an operation to extend the finger of the finger mechanism portion 310A is realized.

One end of the wire W2 is connected to a palm-of-hand side of the distal phalanx portion 314A. The wire W2 is guided out to the back-of-hand side at the middle phalanx portion 313A, and the other end of the wire W2 is connected to an output shaft of the actuator 40b. Therefore, when the wire W2 is pulled on by the actuator 40b, force is applied in the direction of flexing the finger at the DIP joint portion and in the direction of extending the finger at the PIP joint and the MP joint.

One end of the wire W3 is connected to the palm-of-hand side of the middle phalanx portion 313A. The wire W3 is guided out to the back-of-hand side at the proximal phalanx portion 312A, and the other end of the wire W3 is connected to an output shaft of the actuator 40c. Therefore, when the wire W3 is pulled on by the actuator 40c, force is applied in the direction of flexing the finger at the PIP joint and in the direction of extending the finger at the MP joint.

One end of the wire W4 is connected to the palm-of-hand side of the proximal phalanx portion 312A. The wire W4 passes along the palm-of-hand side of the finger mechanism portion 310A, and the other end of the wire W4 is connected to an output shaft of the actuator 40d. Therefore, when the wire W4 is pulled on by the actuator 40d, an operation to flex the finger is realized, pivoting the proximal phalanx portion 312A about the MP joint portion 315A.

The actuators 40a to 40d are controlled by the PC 300C. Specifically, values for realizing positions/angles and attitudes of the respective portions of the finger-form robot 300A, rotary torques, and tensions in the wires W1 to W4 are inputted from the PC 300C to the actuators 40a to 40d. Control is performed to pull on the wires W1 to W4 in response to these input values.

The actuators 40a to 40d each incorporate one of the driver 30 and the position sensor 50. Positions of the wires W1 to W4 are detected by the position sensors 50 of the actuators 40a to 40d and these detection values are outputted to the PC 300C.

The finger-form robot 300A is moved to track the operations (movements) of a human finger and these operations (movements) are sampled in the form of a time series of detection values of the position sensors 50 of the actuators 40a to 40d.

Specifically, respective portions of the finger mechanism portion 310A of the finger-form robot 300A are fixed to corresponding portions of the human finger (that is, the distal phalanx portion 314A to the distal phalanx, the middle phalanx portion 313A to the middle phalanx, and the proximal phalanx portion 312A to the proximal phalanx), putting the finger mechanism portion 310A into a state that tracks operations of the human finger.

Of the distal phalanx portion 314A and the distal phalanx, the middle phalanx portion 313A and the middle phalanx, and the proximal phalanx portion 312A and the proximal phalanx, it is sufficient to fix the distal phalanx portion 314A to the distal phalanx and fix one other of these portions. Fixing of the remaining one portion may be omitted.

The finger-form robot 300B is structured by a finger mechanism portion 310B, wires W5 to W8 that are connected to portions of the finger mechanism portion 310B, and actuators 40e to 40h that perform control to pull on the wires W5 to W8.

The finger mechanism portion 310B is equipped with a base portion 311B, which corresponds to a human metacarpal, a proximal phalanx portion 312B corresponding to a proximal phalanx, a middle phalanx portion 313B corresponding to a middle phalanx, a distal phalanx portion 314B corresponding to a distal phalanx, an MP joint portion 315B corresponding to an MP joint, a PIP joint portion 316B corresponding to a PIP joint, and a DIP joint portion 317B corresponding to a DIP joint.

One end of the wire W5 is connected to the back-of-hand side of the proximal phalanx portion 312B. The wire W5 passes along the back-of-hand side of the finger mechanism portion 310B, and the other end of the wire W5 is connected to an output shaft of the actuator 40e. Therefore, when the wire W5 is pulled on by the actuator 40e, an operation to extend the finger is realized, pivoting the proximal phalanx portion 312B about the MP joint portion 315B. One end of the wire W6 is connected to the back-of-hand side of the middle phalanx portion 313B.

The wire W6 is guided out to the palm-of-hand side at the proximal phalanx portion 312B, and the other end of the wire W6 is connected to an output shaft of the actuator 40f. Therefore, when the wire W6 is pulled on by the actuator 40f, an operation to extend the finger is realized, pivoting the middle phalanx portion 313B about the PIP joint portion 316B.

One end of the wire W7 is connected to the back-of-hand side of the distal phalanx portion 314B. The wire W7 is guided out to the palm-of-hand side at the middle phalanx portion 313B, and the other end of the wire W7 is connected to an output shaft of the actuator 40g. Therefore, when the wire W7 is pulled on by the actuator 40g, an operation to extend the finger is realized, pivoting the distal phalanx portion 314B about the DIP joint portion 317B. One end of the wire W8 is connected to the palm-of-hand side of the distal phalanx portion 314B.

The wire W8 passes along the palm-of-hand side of the finger mechanism portion 310B, and the other end of the wire W8 is connected to an output shaft of the actuator 40h. Therefore, when the wire W8 is pulled on by the actuator 40h, an operation to flex the finger of the finger mechanism portion 310B is realized.

The actuators 40e to 40h are controlled by the PC 300C. Specifically, values for realizing positions/angles and attitudes of the respective portions of the finger-form robot 300B, rotary torques, and tensions in the wires W5 to W8 that have been sampled as operations of the finger-form robot 300A are inputted from the PC 300C to the actuators

40e to 40h. Control is performed to pull on the wires W5 to W8 in response to these input values.

The actuators 40e to 40h each incorporate one of the driver 30 and the position sensor 50. Positions of the wires W5 to W8 are detected by the position sensors 50 of the actuators 40e to 40h and these detection values are outputted to the PC 300C.

The PC 300C is equipped with a communications interface 310, which includes the functions of the reference value input section 10, and the control section 20.

The communications interface 310 receives detection values of the position sensors 50 that are inputted from the finger-form robot 300A and the finger-form robot 300B, and outputs the detection values to the control section 20. The communications interface 310 outputs values of acceleration for controlling the actuators 40a to 40h of the finger-form robot 300A and finger-form robot 300B, which are inputted to the communications interface 310 from the control section 20, to the finger-form robot 300A and the finger-form robot 300B.

In the case of the position/force controller 1 that realizes the bolt-turning learning and reproduction function, a coordinate conversion expressed as in Expression (4) is defined at the control section 20. Consequently, control of the finger-form robot 300B is executed in accordance with operations of the respective finger portions sampled at the finger-form robot 300A.

Thus, when a human performs operations to turn a bolt with the finger-form robot 300A serving as the master device, these operations may be realized and the bolt may be turned by the finger-form robot 300B serving as the slave device. At the same time, forces acting on the finger-form robot 300B from the bolt are reproduced at the finger-form robot 300A by a bilateral control function. That is, reaction forces the same as if the finger of the human was actually turning the bolt are reproduced by the actuators 40a to 40d at the finger of the human performing the operations to turn the bolt.

(Movement Sampling Function)

Now, a sampling function of human movements to be realized by the present invention is described in detail.

As described for the structural example of the position/force controller 1 that realizes the bolt-turning learning and reproduction function according to FIG. 11, a robot with a mechanism corresponding to a function of the human body is constructed, the robot is made to track that function of the human body, and a time series of operations at this time is detected. Thus, human movements may be sampled.

For example, in the case of the finger-form robot 300A shown in FIG. 11, the human moves their finger and operations to turn a bolt are tracked. Positions of the wires W1 to W4 or the wires W5 to W8 while the finger mechanism portion 310A is moving are detected by the position sensors 50 in a time series, and these positions are stored in a storage device.

Instead of detection results of the positions of the wires W1 to W4 or the wires W5 to W8, respective values for calculating state values that are obtained as coordinate conversion results in the control section 20 (that is, the calculated values at the left side of Expression (4) in time series) may be stored in the storage device.

FIG. 12A and FIG. 12B are schematic diagrams showing information examples in which sampling results of a movement are stored. FIG. 12A shows a case in which a time series of positions of the wires W1 to W4 is stored, and FIG. 12B shows a case in which coordinate conversion results according to Expression (4) are stored.

Referring to FIG. 12A, for example, a time series of positions of wire W1 is stored, with position p1 at time t1, position p2 at time t2, position p3 at time t3, etc.

Referring to FIG. 12B, for example, a time series of values of the coordinate conversion result $x''_{a1}$ is stored, with coordinate conversion result q1 at time t1, coordinate conversion result q2 at time t2, coordinate conversion result q3 at time t3, etc.

Thus, if a human performs an operation (movement) with their finger just once, the operation (movement) of the bolt-turning learning and reproduction function or the like may subsequently be reproduced by a robot even without a human performing the operation (movement) with their finger.

(Realizing an Adaptable Function)

Now, realization of an adaptable function, which is enabled by the present invention, is described.

The term "realizing an adaptable function" means, when human movements have been sampled by a movement sampling function as described above, adaptively realizing the sampled function even when an object differs from the object at the time of movement sampling.

Of the coordinate conversions shown in Expression (7) and Expression (8), computations that obtain state values in the force domain are employed for realizing an adaptable function in the present embodiment. That is, in realizing an adaptable function, inputs according to the purpose of realizing the adaptable function are used in the coordinate conversions shown in Expression (7) and Expression (8), whereas other inputs are substantially set to zero. Thus, state values are calculated by a subset of the elements of the coordinate conversion. Using this technique, control energy is distributed to one or both of speed or position energy and force energy, and an adaptable function that is not entirely the same as at the time of the movement sampling is realized.

Specifically, a coordinate conversion for realizing an adaptable function in the present embodiment can be expressed as in Expression (9).

$$\begin{pmatrix} f_{r1} \\ f_{r2} \\ f_{r3} \\ f_{r2} \end{pmatrix} = \begin{pmatrix} 1 & -1 & -1 & -1 \\ 0 & 1 & -1 & -1 \\ 0 & 0 & 1 & -1 \\ 4 & 2 & 1 & 1 \end{pmatrix} \begin{pmatrix} f_5 \\ f_6 \\ f_7 \\ f_8 \end{pmatrix} \quad (9)$$

Below, realizing an adaptable function is described taking the device described in "Structural Example of the Position/Force Controller 1 Realizing the Bolt-Turning Learning and Reproduction Function" according to FIG. 11 as an example.

FIGS. 13A to 13I are descriptive diagrams showing an overview of realizing the adaptable function.

Figure 13G:
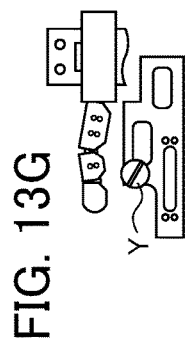
FIGS. 13A to 13I are descriptive diagrams showing an overview of realizing an adaptable function.
Figure 13H:
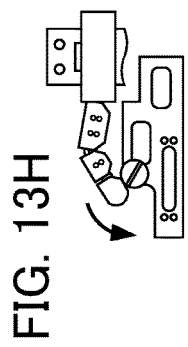
Figure 13I:
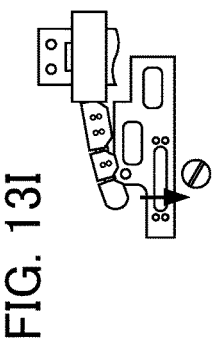
Figure 13D:
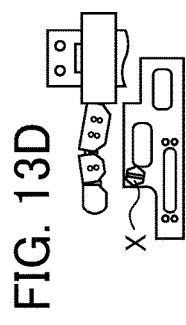
Figure 13E:
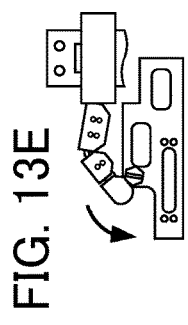
Figure 13F:
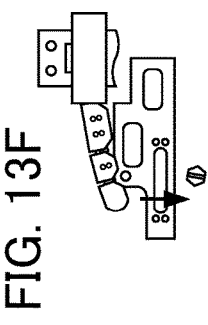
Figure 13A:
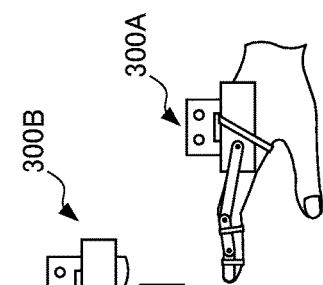
Figure 13B:
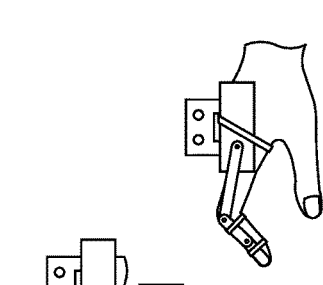
Figure 13C:
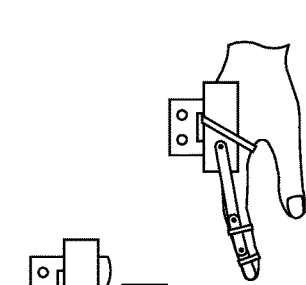

Firstly, as shown in FIG. 13A to FIG. 13C, human operations (movements) to turn a bolt with the position/force controller 1 shown in FIG. 11 are sampled and time series of at least one of, for example, positions or forces of the wires W1 to W4 or the wires W5 to W8 shown in FIG. 12A are stored.

The position/force controller 1 sequentially reads out the time series of the at least one of positions and forces of the wires W1 to W4 or the wires W5 to W8 from the storage device. Using these values as reference values, the coordinate conversion of Expression (8) is sequentially applied for the finger-form robot 300B that serves as a slave device, controlling the actuators 40e to 40f. At this time, the bolt that is in place is a bolt X the same as the bolt at the time of the sampling of human operations (movements) to turn a bolt.

Accordingly, as shown in FIG. 13D to FIG. 13F, the stored operations of the master device represented by the wires W1 to W4 or the wires W5 to W8 are reproduced and the bolt X may be turned and detached in the same manner as at the time of sampling of human operations (movements) to turn a bolt.

In this case, the bolt in place is a bolt Y with a different diameter, shape or the like from the bolt at the time of the sampling of human operations (movements) to turn a bolt.

At this time, the position/force controller 1 sequentially executes the coordinate conversion in Expression (9) using only the positions of the wires W5 to W8 detected by the position sensors 50 of the finger-form robot 300B, and not using the time series of positions of the wires W1 to W4 or wires W5 to W8 that have been stored in the storage device.

State values are calculated using values of $f_{\tau1}$, $f_{\tau2}$, $f_{\tau3}$ and ft2 obtained by the coordinate conversion of Expression (9), and the actuators 40e to 40h are controlled in accordance with the calculated state values.

Accordingly, as shown in FIG. 13G to FIG. 13I, the function may be adaptably realized by sequential calculation of state values in the force domain, for the bolt Y that has the different diameter, shape or the like from bolt X.

Thus, a function with high adaptability to environmental changes such as differences in an object and the like may be realized by applying the basic principle of the present invention.

(Specific Example of Function Replacement)

Plural coordinate conversions defined by the function-dependent force/speed distribution conversion block FT are stored in advance in the basic structure of the position/force controller 1 shown in FIG. 8. The function being realized by the position/force controller 1 may be replaced by replacing the coordinate conversion set in the function-dependent force/speed distribution conversion block FT.

Figure 14:
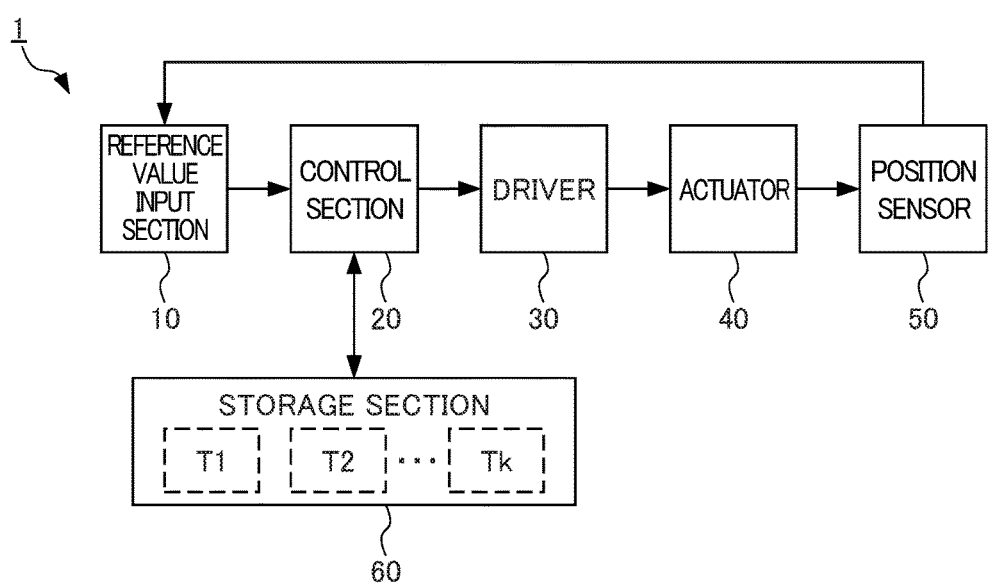
FIG. 14 is a schematic diagram showing structures of the position/force controller 1 that can replace a function.

FIG. 14 is a schematic diagram showing structures of the position/force controller 1 that can replace a function.

The position/force controller 1 shown in FIG. 14 differs from the position/force controller 1 shown in FIG. 8 in being provided with a storage section 60 that stores plural coordinate conversions representing functions.

In accordance with a function that is to be realized, the control section 20 reads one of coordinate conversions T1 to Tk (k is an integer that is at least 1) stored in the storage section 60, and sets that coordinate conversion in the function-dependent force/speed distribution conversion block FT.

Thus, the position/force controller 1 may be configured to be capable of appropriately realizing the function that is the objective among the plural prepared functions.

This position/force controller 1 is particularly useful in a case in which plural functions are to be realized by one of the control section 20, a case in which plural robots are to be controlled by one of the control section 20, or the like.

(Scaling Function)

The position/force controller 1 described above may realize scaling functions of position, force and time.

The term "scaling function" means a function that magnifies or reduces the scale of positions, forces or times of outputs of controls that serve as a reference. With a scaling function, for example, the magnitude of movements of a master device may be reduced and reproduced by a slave device, the strength (force) of movements of a master device may be strengthened and reproduced by a slave device, or the speed of movements of a master device may be lowered and reproduced by a slave device. By using a scaling function on information of at least one of positions and forces stored in a storage device, for example, the magnitudes of stored movements may be reduced and reproduced by a slave device or strengths (forces) of stored movements may be strengthened and reproduced by a slave device.

Below, a structural example for realizing a scaling function is described.

(Force-Sense Transmission Function with Scaling)

A coordinate conversion at the function-dependent force/speed distribution conversion block FT according to FIG. 2 for a case of realizing a force-sense transmission function with scaling can be expressed as in the following Expressions $$\begin{pmatrix} \dot{x}_p \\ \dot{x}_f \end{pmatrix} = \begin{pmatrix} 1 & -\alpha \\ 1 & \beta \end{pmatrix} \begin{pmatrix} \dot{x}_m \\ \dot{x}_s \end{pmatrix} \quad (10)$$

$$\begin{pmatrix} f_p \\ f_f \end{pmatrix} = \begin{pmatrix} 1 & -\alpha \\ 1 & \beta \end{pmatrix} \begin{pmatrix} f_m \\ f_s \end{pmatrix} \quad (11)$$

With the coordinate conversion shown in Expression (10) and Expression (11), positions of a slave device are magnified by $\alpha$ ($\alpha$ is a positive number) and transmitted to a master device, and forces at the slave device are magnified by $\beta$ ($\beta$ is a positive number) and transmitted to the master device.

This scaling function makes, for example, delicate tasks such as surgical operations, microassembly and the like and large-scale tasks such as construction work, extravehicular activities in space and the like possible.

(Force-Sense Transmission Function with Position Limiting by Scaling)

A coordinate conversion at the function-dependent force/speed distribution conversion block FT according to FIG. 2 for a case of realizing a force-sense transmission function with position limiting by scaling can be expressed as in the following Expressions (12) to (15).

When realizing this function, it is appropriate to take account of the following conditions:

Continuity even in the speed dimension (a Jacobian matrix is required)

Positions beyond a limit are a monotonically increasing function of an original position (stability is required)

If $x_s < a$, then $x_s = x_{shat}$ or $x_s \approx x_{shat}$ ($x_{shat}$ is a parameter included in Expression (14) and Expression (15) at the function-dependent force/speed distribution conversion block FT (control performance in a stable region must be assured)

There is a saturation function (position-limiting must be realized) As an alternative function that satisfies these conditions, an arctangent function may be employed.

IF Xs<a, $$\begin{pmatrix} \dot{x}_p \\ \dot{x}_f \end{pmatrix} = \begin{pmatrix} 1 & -1 \\ 1 & 1 \end{pmatrix} \begin{pmatrix} \dot{x}_m \\ \dot{x}_s \end{pmatrix} \quad (12)$$

$$\begin{pmatrix} f_p \\ f_f \end{pmatrix} = \begin{pmatrix} 1 & -1 \\ 1 & 1 \end{pmatrix} \begin{pmatrix} f_m \\ f_s \end{pmatrix} \quad (13)$$

IF Xs≤a, $$\begin{pmatrix} \dot{x}_p \\ \dot{x}_f \end{pmatrix} = \begin{pmatrix} 1 & -e^{b(\dot{x}_s-a)} \\ 1 & e^{b(\dot{x}_s-a)} \end{pmatrix} \begin{pmatrix} \dot{x}_m \\ \dot{x}_s \end{pmatrix} \quad (14)$$

$$\begin{pmatrix} f_p \\ f_f \end{pmatrix} = \begin{pmatrix} 1 & -e^{b(\dot{x}_s-a)} \\ 1 & e^{b(\dot{x}_s-a)} \end{pmatrix} \begin{pmatrix} f_m \\ f_s \end{pmatrix} \quad (15)$$

If the coordinate conversions shown in Expression (12) to Expression (15) are used, then when the position of the slave device is less than a, the coordinate conversions in Expressions (12) and (13) are employed. Thus, the slave device is controlled to the same position as the master device. On the other hand, when the position of the slave device is at least a, the coordinate conversions in Expressions (14) and (15) are employed. Thus, the scaling function is active and the slave device is controlled such that its position does not go beyond (1/b+a).

This scaling function makes, for example, protecting organs in surgical operations and avoiding breakage of physical bodies possible.

(Force-Sense Transmission Function Using Scaling in Frequency Ranges)

Figure 15:
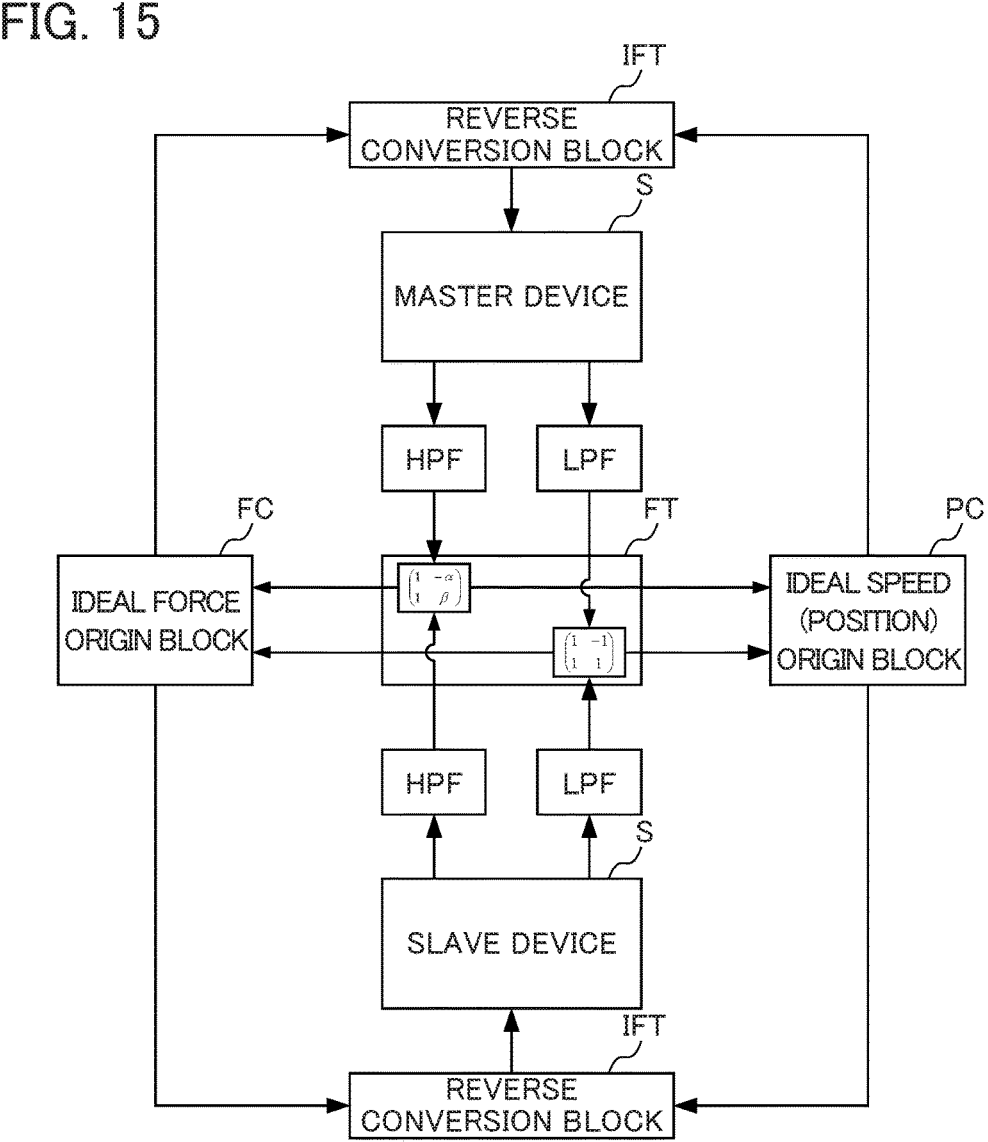
FIG. 15 is a schematic diagram showing an overview of control of a force-sense transmission function that uses scaling in frequency ranges.

FIG. 15 is a schematic diagram showing an overview of controlling the force-sense transmission function using scaling in frequency ranges.

In FIG. 15, the outputs of a master device and a slave device are respectively passed through a high-pass filter (HPF) and a low-pass filter (LPF), and then inputted to the function-dependent force/speed distribution conversion block FT.

In the function-dependent force/speed distribution conversion block FT, a coordinate conversion for a high-frequency region is applied to the outputs of the master device and slave device that have passed through the high-pass filter, and a coordinate conversion for a low-frequency region is applied to the outputs of the master device and slave device that have passed through the low-pass filter. That is, the function-dependent force/speed distribution conversion block FT splits the inputs from the master device and the slave device into signals in the high-frequency region and the low-frequency region and applies coordinate conversions corresponding to the respective frequency regions.

As shown in FIG. 15, the coordinate conversions at the function-dependent force/speed distribution conversion block FT for a case of realizing a force-sense transmission function using scaling in frequency ranges can be expressed as in the following Expressions (16) to (19).

For the Low-Frequency Region, $$\begin{pmatrix} \dot{x}_p \\ \dot{x}_f \end{pmatrix} = \begin{pmatrix} 1 & -1 \\ 1 & 1 \end{pmatrix} \begin{pmatrix} \dot{x}_m \\ \dot{x}_s \end{pmatrix} \quad (16)$$

$$\begin{pmatrix} f_p \\ f_f \end{pmatrix} = \begin{pmatrix} 1 & -1 \\ 1 & 1 \end{pmatrix} \begin{pmatrix} f_m \\ f_s \end{pmatrix} \quad (17)$$

For the High-Frequency Region, $$\begin{pmatrix} \dot{x}_p \\ \dot{x}_f \end{pmatrix} = \begin{pmatrix} 1 & -\alpha \\ 1 & \beta \end{pmatrix} \begin{pmatrix} \dot{x}_m \\ \dot{x}_s \end{pmatrix} \quad (18)$$

-continued $$\begin{pmatrix} f_p \\ f_f \end{pmatrix} = \begin{pmatrix} 1 & -\alpha \\ 1 & \beta \end{pmatrix} \begin{pmatrix} f_m \\ f_s \end{pmatrix} \quad (19)$$

If the coordinate conversions shown in Expression (16) to Expression (19) are used, the coordinate conversions in Expressions (16) and (17) are employed for the low-frequency region. Thus, the slave device is controlled to the same position as the master device. The coordinate conversions in Expressions (18) and (19) are employed in the high-frequency region. Thus, positions of the slave device are magnified by a (a is a positive number) and transmitted to the master device, and forces at the slave device are magnified by β (β is a positive number) and transmitted to the master device.

By this scaling function, a sensation when, for example, the slave device passes through or breaks a body is strengthened and transmitted to the master device.

(Reproducing a Function Using Time Scaling)

In reproduction of a function with the position/force controller 1, time scaling may be realized by applying thinning to information representing the function that has been learned and stored (for example, the time series of data representing sampling results of movements that are shown in FIG. 12A and FIG. 12B), or by specifying target values by interpolation or the like.

To be specific, a stored function (operation) may be reproduced at a higher speed by thinning information representing the function that has been learned and stored and then using the thinned information as target values of computation at the ideal force origin block FC or the ideal speed (position) origin block PC. Similarly, a stored function (operation) may be reproduced at a lower speed by interpolating information representing the function that has been learned and stored and then using the interpolated information as target values.

Accordingly, if a stored function (operation) is to be reproduced at a higher speed, a slow and precise operation may be performed at the time of movement sampling. Thus, a fast and precise operation may be performed at the time of reproduction.

Furthermore, if a stored function (operation) is reproduced at a lower speed, an operation that is usually carried out quickly may be reproduced slowly. For example, in rehabilitation of patients suffering from the after-effects of injuries or the like, training operations may be reproduced in accordance with the patients' conditions.

(Specific Application Examples)

Various application examples may be realized by using the functions described in the embodiment above singly or in combination.

(Application to an Electronic Game)

Figure 16:
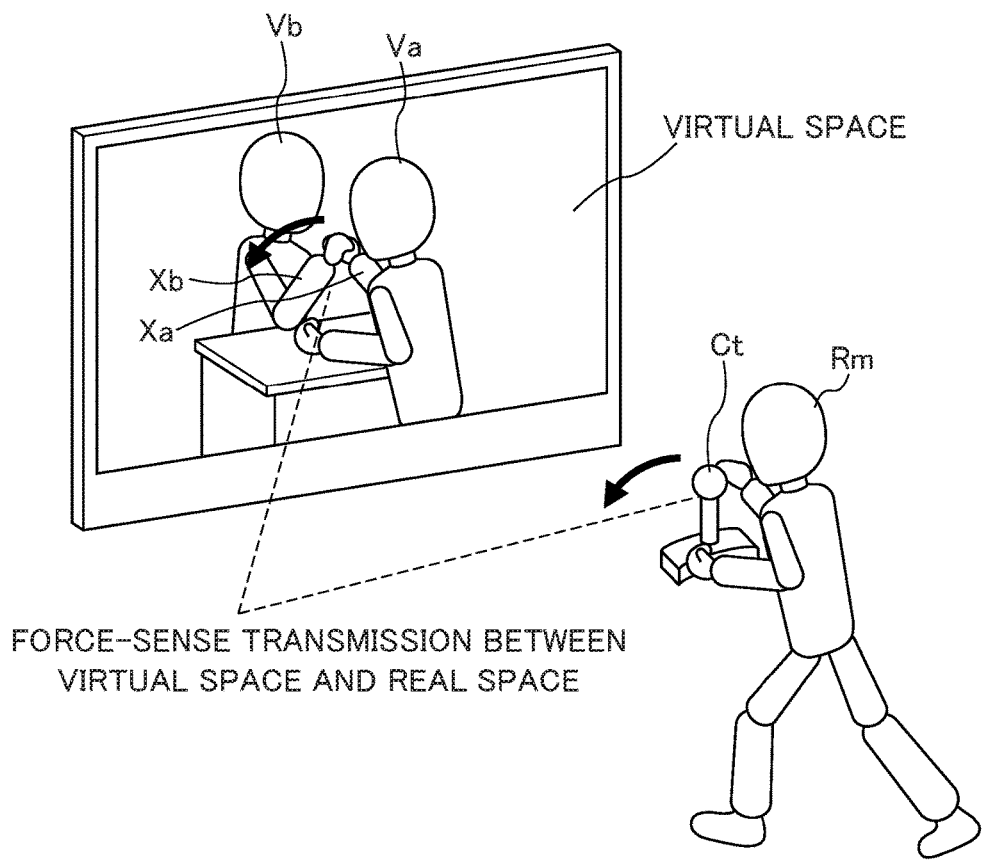
FIG. 16 is a schematic diagram showing a situation in which the force-sense transmission function is realized with a body in a virtual space.

FIG. 16 is a schematic diagram showing a situation in which the force-sense transmission function is realized with a body in a virtual space.

FIG. 16 shows an example in which the present invention is applied to an electronic game (for example, a game of arm wrestling or the like) that transmits forces and senses between an operator and an object in a virtual space.

Figure 17:
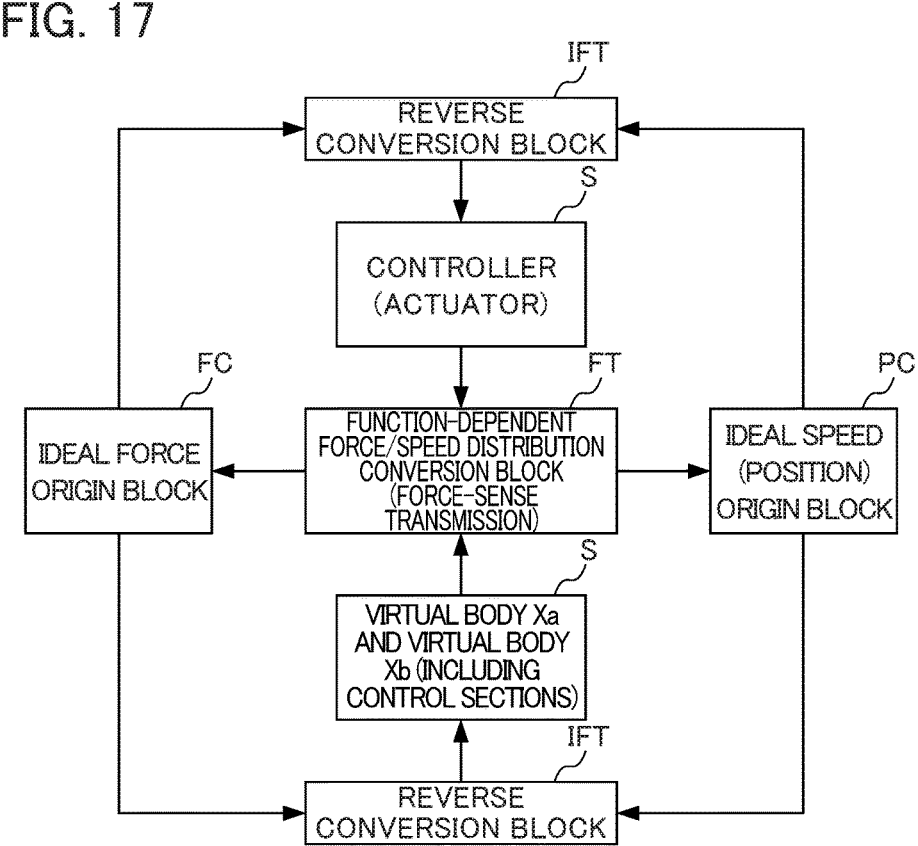
FIG. 17 is a schematic diagram showing an overview of control when the force-sense transmission function is realized with the body in the virtual space.

FIG. 17 is a schematic diagram showing an overview of control when the force-sense transmission function is realized with the body in the virtual space.

As shown in FIG. 16, an operator Rm controls a controller (an actuator) Ct that serves as a master device.

Correspondingly, a virtual body Xa (in this example, an arm of a virtual person Va) moves to match movements of the controller Ct.

When the virtual body Xa touches a virtual body Xb (in this example, an arm of a virtual person Vb), as shown in FIG. 17, contact between the virtual body Xa and the virtual body Xb acts as a slave device. Position and force energy are distributed and converted in correspondence with variables in the virtual space and variables in real space.

During this, force-sense transmission is conducted between the controller Ct and the virtual body Xa; forces and senses experienced by the virtual person Va who is arm wrestling with the virtual personal Vb are transmitted.

Thus, the present invention may be applied to an electronic game in which objects and forces interact in a virtual space.

An object in a virtual space may be an object that is virtually generated, a real object that is modeled in the virtual space, or the like.

In accordance with this application example, a situation of fighting with an enemy character in a virtual space, a situation of driving in a virtual vehicle along a race course constituted of various road surfaces in a virtual space, a situation of moving a body in a virtual space and so forth may be realized with high levels of realism.

Because a controller Ct may function as a master device by receiving control signals for an actuator, there is no need to install a program or a large number of sensors in the controller Ct. Thus, the controller Ct may be realized cheaply with a simple structure.

In FIG. 16, the controller Ct that serves as the master device is shown as a lever-type device, but the specific form of the controller Ct may be variously altered in accordance with the type of electronic game and the like. For example, a controller may be formed that is provided with an inner tube and an outer tube disposed coaxially, in which the outer tube may be turned around the inner tube by an actuator. In this case, depending on the details of the electronic game, the operator Rm may perform operations of turning the outer tube and the actuator may control turning forces and turning amounts of the outer tube by the force-sense transmission function.

(Application to Surgical Forceps)

FIGS. 18A to 18D are schematic diagrams showing a situation in which the present invention is applied to surgical forceps.

As shown in FIG. 18A, a force-sense transmission function may be realized between an operator Rm controlling a master device and actuators of a forceps that serves as a slave device.

In this case, if simple force-sense transmission is performed, then when the master device is controlled to move upward relative to a pivot, as shown in FIG. 18B, the forceps of the slave device is also displaced upward. Thus, movements may be opposite to human intuition.

That is, when an original forceps is being manipulated, because the forceps is a rigid object, a control portion of the forceps is controlled to move upward when the operator intends to move the distal end of the forceps downward. Therefore, the movement in FIG. 18B is an opposite movement to the movement when an original forceps that is a rigid object is being manipulated.

Accordingly, as shown in FIG. 18C, the forceps of the slave device may be controlled to a state of being displaced downward when the master device is controlled to move upward relative to a pivot, as shown in FIG. 18D, by a mirror conversion being applied to the coordinate conversion at the function-dependent force/speed distribution conversion block FT. That is, the movement is the same as that when an original forceps that is a rigid object is being manipulated.

Therefore, controls that are intuitive for the operator are possible.

By applying this mirror conversion, the operator may flexibly specify a viewpoint relative to an object and adjust the viewpoint to a state in which control is easy for the operator.

Moreover, scaling may be applied to the coordinate conversion in the function-dependent force/speed distribution conversion block FT to which the mirror conversion has been applied.

For example, if scaling is applied to reduce the scale of control of the master device, a conversion to delicate movements of the forceps is possible, which may facilitate difficult surgical operations requiring high levels of caution at the heart, the brain and the like.

In this case, the scaling ratio may be a fixed ratio, or alternatively may be a ratio that varies depending on conditions, or the like.

For example, in a heart operation, the ratio of operations of the master device and the slave device may be set to 1:1 or the like at an open heart stage, but at a stage in which the heart is closed up, the scaling ratio may be reduced such that operations of the slave device are shrunk in scale relative to operations of the master device.

(Application to a Master Device and Slave Device Connected by Wireless)

Figure 19:
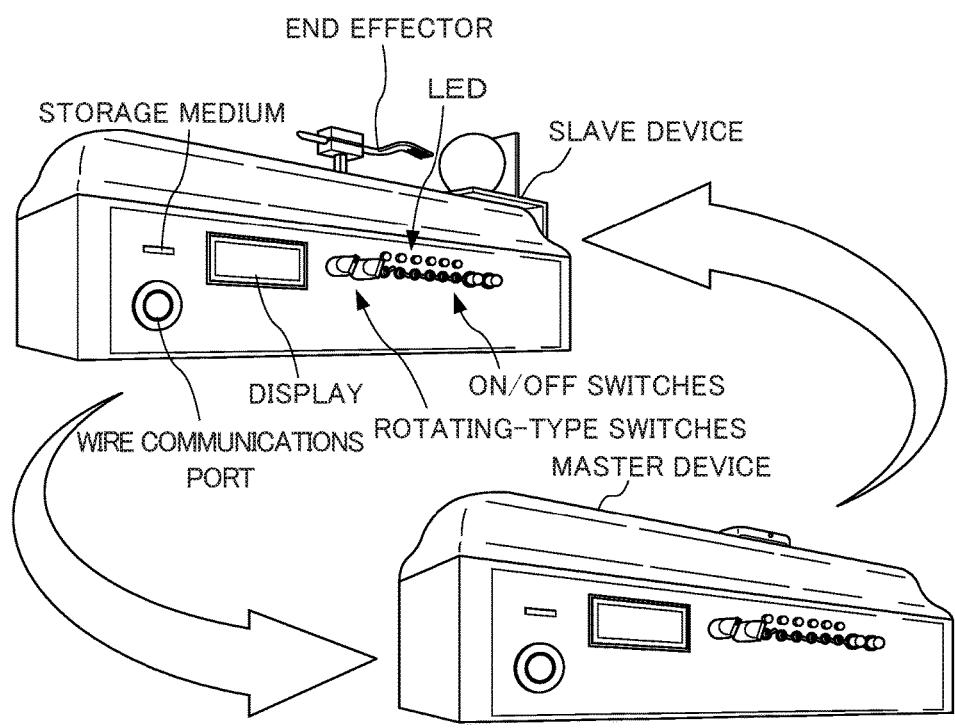
FIG. 19 is a schematic diagram showing a master device and a slave device that are connected by wireless.

FIG. 19 is a schematic diagram showing a master device and a slave device that are connected by wireless.

Because the master device and slave device are connected by wireless and communicate at high-speed, a master/slave system with high real-time performance and excellent portability may be realized.

That is, various functions such as the force-sense transmission function and the like may be realized at the slave device that is connected by wireless with the master device.

Figure 20:
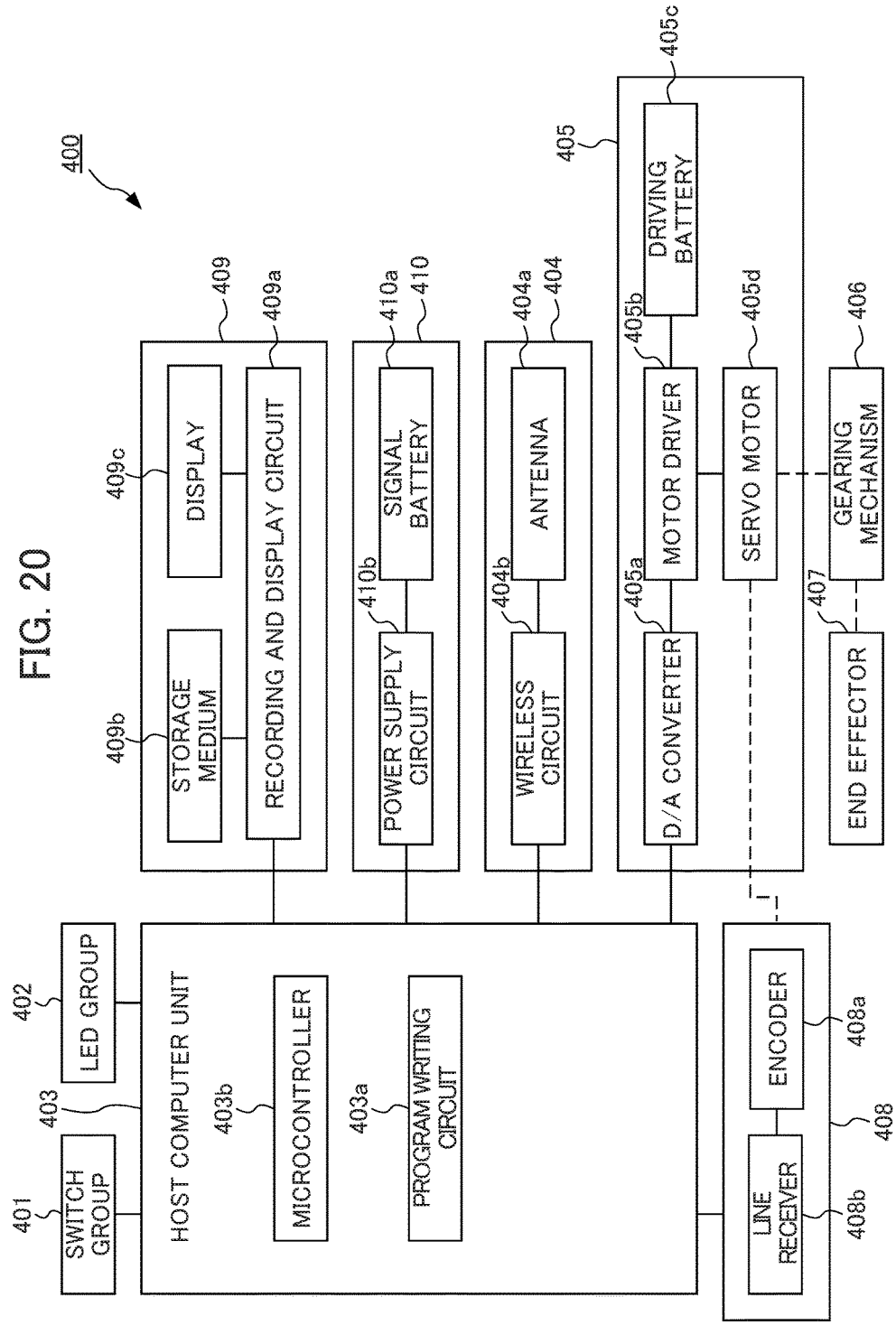
FIG. 20 is a block diagram showing structures of a slave device 400 that is connected by wireless to a master device.

FIG. 20 is a block diagram showing structures of a slave device 400 that is connected by wireless to a master device.

As shown in FIG. 20, the slave device 400 is equipped with a switch group 401, an LED group 402, a host computer unit 403, a wireless unit 404, a motor unit 405, a gearing mechanism 406, an end effector 407, a measurement unit 408, a recording and display unit 409, and a power supply unit 410.

The switch group 401 is provided with plural rotating-type switches and on/off switches, and accepts various settings of the slave device 400. Specifically, rotating-type switches are used to adjust scaling ratios of the slave device 400. In the present embodiment, position scaling and force scaling may be respectively separately set by rotating-type switches. On/off switches are used to set states of the slave device 400. For example, a first on/off switch functions as a power supply switch. When the first on/off switch is set to on, a power supply circuit 410b is put into an electrified state and electric power from a signal battery 410a is supplied to a control system of the slave device 400. A second on/off switch functions as a servo motor switch. When the second on/off switch is set to on, a power supply of a motor driver 405b is turned on and a supply of power to a servo motor 405d is put into a standby state. A third on/off switch functions as a control switch. When the third on/off switch is set to on, a control program is executed and the supply of power (driving) to the servo motor 405d is started. Control of the slave device 400 in the master/slave system is started by the first, second and third on/off switches being set to on in this order.

The LED group 402 expresses various states of the slave device 400 (an on/off state of the power supply and the like) by lighting states.

The host computer unit 403 is equipped with a program writing circuit 403a and a microcontroller 403b.

The program writing circuit 403a writes programs to the microcontroller 403b.

The microcontroller 403b controls the slave device 400 in accordance with a program written by the program writing circuit 403a. Specifically, the microcontroller 403b communicates by wireless with the master device while controlling positions and forces against an object or conducting measurements of the actions of an object.

The wireless unit 404 is equipped with an antenna 404a and a wireless communications circuit 404b.

The antenna 404a receives wireless signals from the master device and transmits wireless signals from the slave device 400 to the master device.

The wireless communications circuit 404b demodulates wireless signals inputted from the antenna 404a and outputs demodulated control signals to the host computer unit 403. The wireless communications circuit 404b also modulates control signals inputted from the host computer unit 403 and outputs them to the antenna 404a.

The motor unit 405 is equipped with a D/A converter 405a, the motor driver 405b, a driving battery 405c and the servo motor 405d.

The D/A converter 405a converts digital signals (control signals) inputted from the host computer unit 403 to analog signals.

The motor driver 405b drives the servo motor 405d in response to analog signals inputted from the D/A converter 405a.

The driving battery 405c supplies power for driving the servo motor 405d.

The servo motor 405d controls positions and forces of the end effector 407, via the gearing mechanism 406, in response to driving signals from the motor driver 405b.

The gearing mechanism 406 decelerates operations of the motor driver 405b, modifying the torque, and transmits the operations to the end effector 407.

The end effector 407 constitutes an interface that interacts directly with an object. In the present embodiment, a fork-shaped tool is provided to serve as the end effector 407.

The measurement unit 408 is equipped with an encoder 408a and a line receiver 408b.

The encoder 408a measures operations of the servo motor 405d (turning angles) and converts the same to electronic signals.

The line receiver 408b outputs the measurement result electronic signals outputted from the encoder 408a to the host computer unit 403 as differential signals. A speed sensor, an acceleration sensor or an alternative estimation method may be substituted in order to achieve an application of the slave device 400.

The recording and display unit 409 is equipped with a recording and display circuit 409a, a storage medium 409b and a display 409c.

In response to commands from the host computer unit 403, the recording and display circuit 409a stores control information on positions and forces of the servo motor 405d, scaling ratios, electromagnetic conditions of the wireless connection, and information relating to the device and a body being touched such as times and the like in the storage medium 409b, and displays the same at the display 409c. The recording and display circuit 409a also reads information stored in the storage medium 409b and outputs the information to the host computer unit 403.

In response to control by the recording and display circuit 409a, the storage medium 409b stores control information on positions and forces of the servo motor 405d in operations of the slave device 400, scaling ratios, electromagnetic conditions of the wireless connection, and information relating to the device and a body being touched such as times and the like. The information stored in the storage medium 409b may be read out for data processing. Information for reproducing operations at the slave device 400 may be stored in the storage medium 409b, and the microcontroller 403b may reproduce the operations by reading and executing this information.

The power supply unit 410 is equipped with the signal battery 410a and the power supply circuit 410b.

The signal battery 410a supplies electric power to the control system of the slave device 400.

The power supply circuit 410b controls the electric power being supplied to the control system of the slave device 400 from the signal battery 410a.

The master device and slave device may be connected by communications by wireless, and alternatively may be connected by communications by wire, via a wire communications port (see FIG. 19).

According to this structure, when the end effector 407 touches an object (a ball or the like) in response to movements of the master device, positions and reaction forces of the servo motor 405d are transmitted from the slave device 400 to the master device as position and force information. Correspondingly, a function that transmits force and sense of the slave device 400 or the like may be realized at the master device.

Now, a data transmission process between the master device and the slave device is described.

Figure 21:
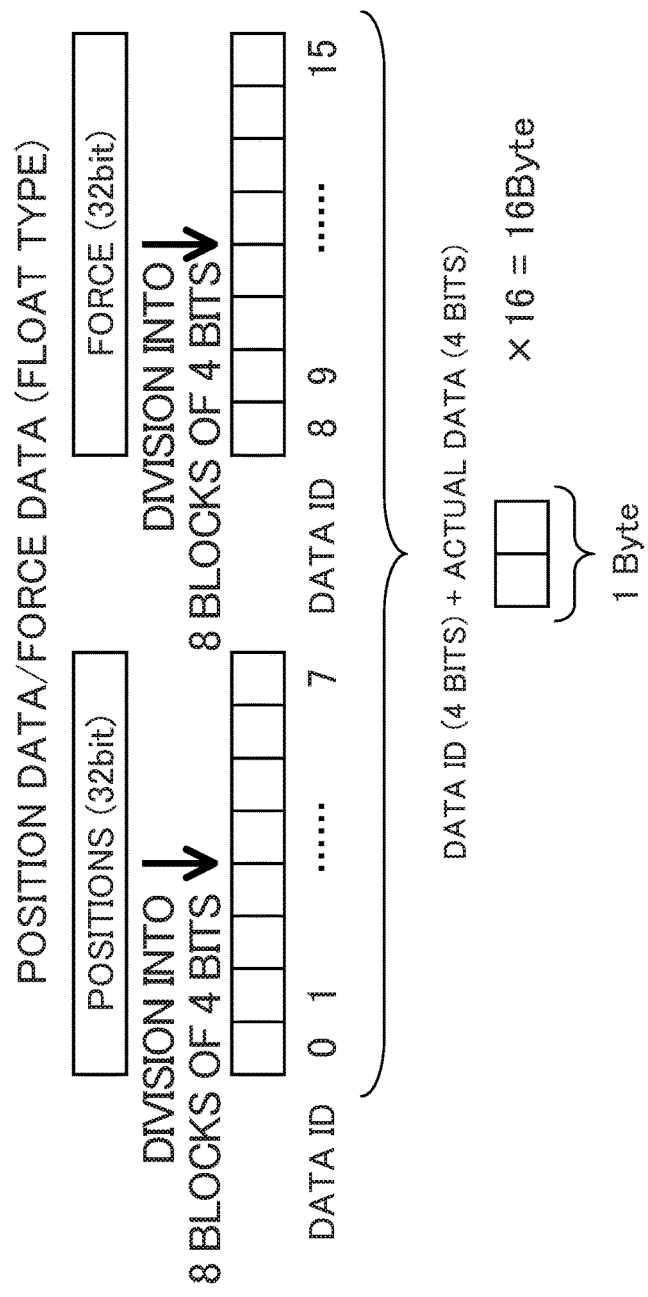
FIG. 21 is a diagram showing a data structure for high-speed communications between the master device and the slave device.

FIG. 21 is a diagram showing a data structure for high-speed communications between the master device and the slave device. As shown in FIG. 21, in the present application example, information on a position and a force is expressed as a total of 64 bits of data (respective 32-bit "float" type variables), which are to be propagated at high speed.

Accordingly, the position and force data is first divided into 16 data blocks. Therefore, each data block has an information quantity of four bits. To identify the order of the 16 four-bit blocks, four-bit data IDs are appended to the heads of the data blocks. Thus, 16 one-byte data blocks, each constituted by a four-bit data ID and four bits of actual data, are created, providing a total of sixteen bytes of data.

This is propagated between the master device and the slave device by the following procedure.

Figure 22:
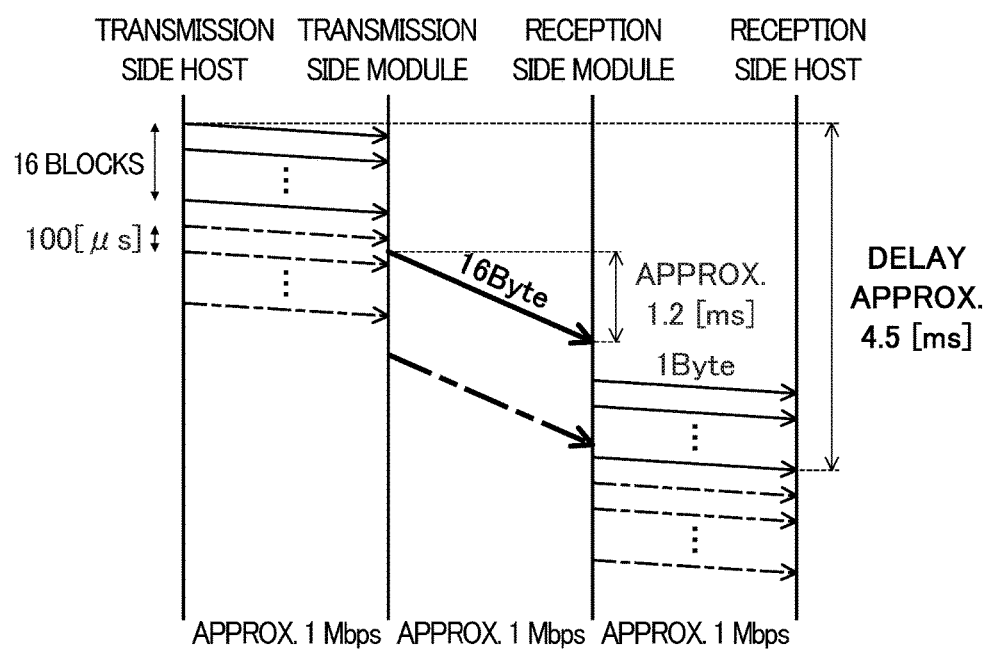
FIG. 22 is a timing chart showing a communication sequence between the master device and slave device that are connected by wireless.

FIG. 22 is a timing chart showing a communication sequence between the master device and slave device that are connected by wireless.

In the master/slave system according to the present application example, in order to speed up processing, a control program is directly installed in an internal memory control unit (MCU) at each of the master device and the slave device.

In FIG. 22, a transmission side host (a processor or the like at the transmission side) transfers the 16 data blocks shown in FIG. 21 to a transmission side module (the communications interface or the like at the transmission side), one block at a time. Here, 100 μs is sufficient to transfer each block; a transfer rate between the transmission side host and the transmission side module of around 1 Mbps can be assured.

Then, wireless communications are conducted between the transmission side module and a reception side module (the communications interface or the like at the reception side). A propagation rate along the wireless communications path of around 1 Mbps can be assured; approximately 1.2 ms is sufficient to propagate the 16 data blocks.

Between the reception side module and a reception side host (a processor at the reception side or the like), a propagation rate of around 1 Mbps can be assured; 100 µs is sufficient to transfer each 1-byte data block.

Thus, propagation of the 16 bytes of data from the start of output of data by the transmission side host to the reception side host is around 4.5 ms.

Thus, in the present application example, a control program is directly installed in each internal MCU, position and force information are each divided into eight blocks of four bits and propagated to the communications module, and a packet size in the wireless communications path is reduced to 16 bytes.

In a conventional protocol such as, for example, UCP/IP, the packet size is 24 bytes because of various kinds of header information and the like. In contrast, in the present application example, the required packet size is 16 bytes.

Therefore, the master/slave system that is connected by wireless may be realized as a system with high real-time performance and excellent portability.

(Application to Creating a Database of Operations)

Figure 23:
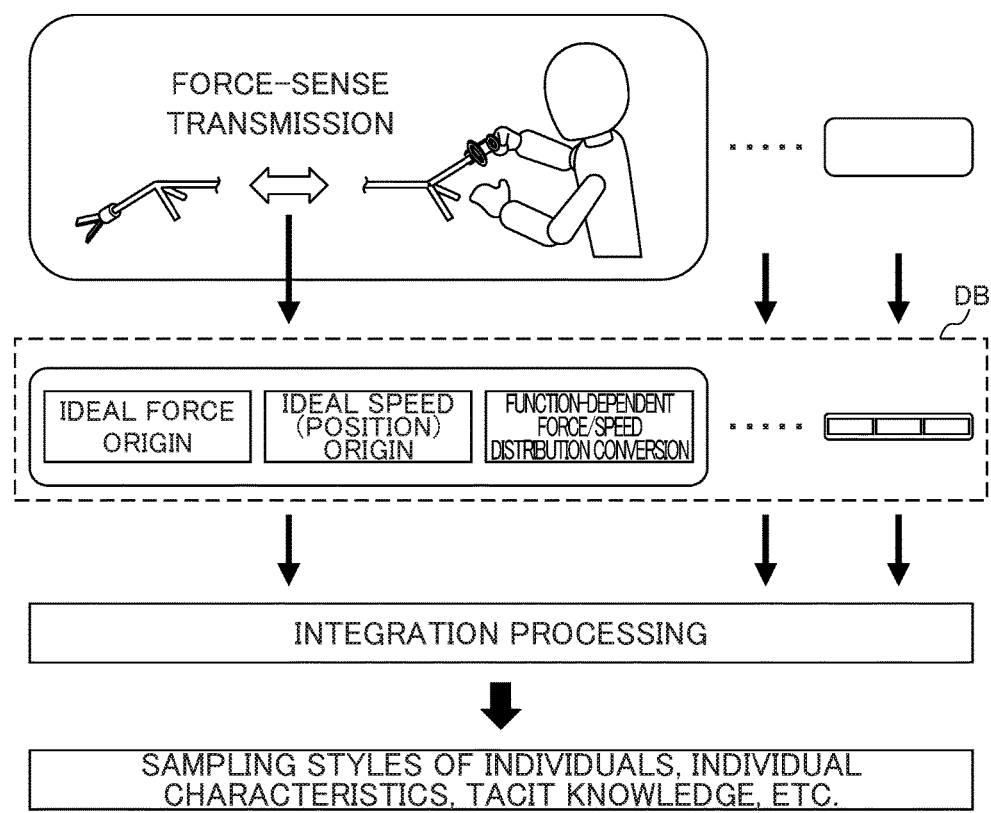
FIG. 23 is a schematic diagram showing an overview of creating a database of human operations.

FIG. 23 is a schematic diagram showing an overview of creating a database of human operations.

As mentioned above, a speed (position) of an actuator is expressed by an integral of acceleration, and a force of the actuator is expressed as a product of weight and acceleration.

Therefore, in the present invention, a human operation may be quantified and sampled from at least one of information on positions of an actuator and information on forces that is obtained on the basis of information on positions of the actuator.

As shown in FIG. 23, operations performed by an operator are measured by a force-sense transmission function according to the present invention.

That is, when the operator controls a master device, an operation performed by the operator is broken down by computations at the function-dependent force/speed distribution conversion block FT, the ideal force origin block FC and the ideal speed (position) origin block PC, and this operation may be realized.

By operations by a plural number of humans being broken down by computations at the function-dependent force/speed distribution conversion block FT, the ideal force origin block FC and the ideal speed (position) origin block PC and the results being acquired, information processed in each of these blocks may be accumulated in a database DB.

Thus, by integration processing being applied to the information of operations by plural humans accumulated in the database, characteristics of operations by individual people (individual styles, comparisons between individuals and the like) may be sampled and quantified.

Therefore, by integration processing being applied to operation information of experienced and inexperienced people or the like, tacit knowledge, skills, knowhow and the like may be sampled to produce objective numerical data.

(Application Using Offsetting in Function-Dependent Force/Speed Distribution Conversion)

Figure 24:
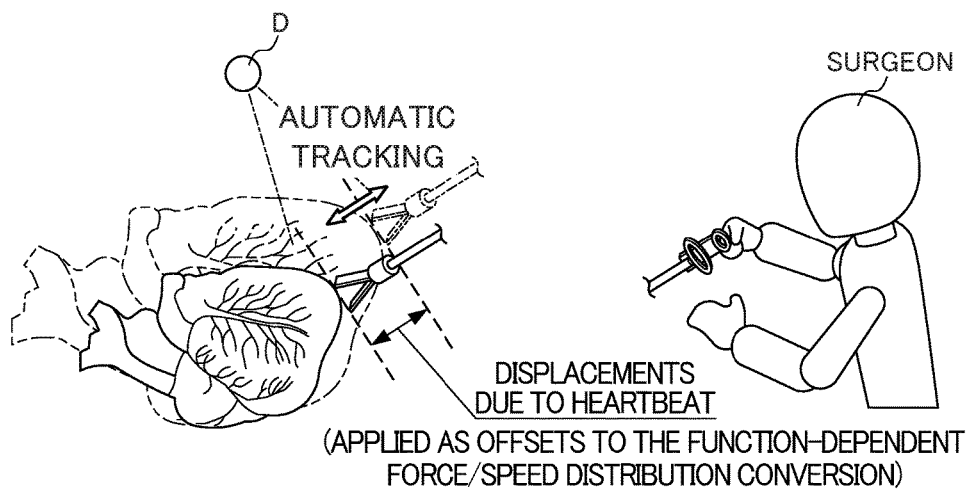
FIG. 24 is a schematic diagram showing an overview of offsetting in function-dependent force/speed distribution conversion.

FIG. 24 is a schematic diagram showing an overview of offsetting in function-dependent force/speed distribution conversion.

Offsetting in function-dependent force/speed distribution conversion enables tracking of changes in an object by increasing or decreasing predetermined constants corresponding to position and force energy in the results of conversion at the function-dependent force/speed distribution conversion block FT.

That is, as shown in FIG. 24, a position of the object measured by an external sensor D or the like may be applied as an offset in the function-dependent force/speed conversion.

For example, in the case of a heart operation, because the object—the heart—is continuously beating, a position of the surface of the heart is measured by the external sensor D and the measured changes in position are applied as offsets in the function-dependent force/speed conversion. Thus, automatic tracking of the heart surface by a slave device (for example, a forceps or the like) may be realized.

At this time, by the offset being applied to a force-sense transmission function, both force-sense transmission and automatic tracking of the position of the heart surface are possible.

Therefore, the effects of displacements due to beating of the heart on a surgeon performing the operation may be moderated and more precise work is possible.

(Effects)

As described above, according to a position/force controller in accordance with a first aspect of the present invention, a function-dependent force/speed distribution converter, on the basis of speed or position information and force information corresponding to the information relating to the position and on the basis of information serving as a reference for control, performs a conversion to distribute control energy to speed or position energy and force energy in accordance with a function that is being realized. A position control amount calculator calculates a speed or position control amount on the basis of the speed or position energy distributed by the function-dependent force/speed distribution converter. A force control amount calculator calculates a force control amount on the basis of the force energy distributed by the function-dependent force/speed distribution converter. An integrator integrates the speed or position control amount with the force control amount and, in order to return an output of the integration to the actuator, performs a reverse conversion on the speed or position control amount and the force control amount and determines an input to the actuator. Thus, the speed or position energy and the force energy can be respectively separately controlled.

Therefore, the distribution of control energy to speed or position energy and force energy by the function-dependent force/speed distribution converter may be variously altered in accordance with functions.

Consequently, by settings of the function-dependent force/speed distribution converter being altered in accordance with a function that is an objective, a technique for appropriately realizing human-like movements by a robot may be provided.

According to a position/force controller in accordance with a second aspect of the present invention, a function-dependent force/speed distribution converter, on the basis of speed or position information and force information corresponding to the information relating to the position and on the basis of information serving as a reference for control that is acquired in advance, performs a conversion to distribute control energy to at least one of speed or position energy and force energy in accordance with a function that is being realized. A position control amount calculator calculates at least one of a speed or position control amount and a force control amount energy on the basis of at least one of the speed or position energy and the force energy distributed by the function-dependent force/speed distribution converter. An integrator integrates the speed or position control amount with the force control amount and, in order to return an output of the integration to the actuator, performs a reverse conversion on the speed or position control amount and the force control amount and determines an input to the actuator.

Therefore, because the control amounts of speed (position) or force are calculated on the basis of the information serving as a reference for control that is acquired in advance, a function acquired in advance may be reproduced.

According to a position/force controller in accordance with a third aspect of the present invention, the function-dependent force/speed distribution converter, on the basis of speed or position information and force information corresponding to the information relating to the position and on the basis of information serving as a reference for control, performs a conversion to distribute control energy to speed or position energy and force energy by a conversion that is specified to match a function that is being realized. A position control amount calculator calculates a speed or position control amount on the basis of the speed or position energy distributed by the function-dependent force/speed distribution converter. A force control amount calculator calculates a force control amount on the basis of the force energy distributed by the function-dependent force/speed distribution converter. An integrator integrates the speed or position control amount with the force control amount and, in order to return an output of the integration to the actuator, performs a reverse conversion on the speed or position control amount and the force control amount and determines an input to the actuator. A scaler applies scaling of at least one of position, force and time to outputs of the actuator.

Therefore, because the control energy is distributed to the speed or position energy and the force energy by a conversion that is specified to match the function being realized, the function may be realized in accordance with a particular objective. Moreover, because scaling of position, force and time may be applied to the outputs of the actuator due to the scaler being interposed at a location on a control path, the magnitude of movements of the actuator may be reduced, the strength (force) of movements may be strengthened, or the speed of movements may be lowered.

EXPLANATION OF REFERENCE NUMERALS

S control object system, FT function-dependent force/speed distribution conversion block (function-dependent force/speed distribution converter), FC ideal force origin block (force control amount calculator), PC ideal speed (position) origin block (position control amount calculator), IFT reverse conversion block (integrator), 1 position/force controller, 10 reference value input section, 20 control section, 30 driver, 40 actuator, 50 position sensor (position detector), 60 storage section.

The invention claimed is:
1. A position/force controller comprising:
an actuator that moves a movable section;
a position detector that detects information relating to a position based on an action of the actuator;
a function-dependent force/speed distribution converter that, based on speed or position information and force information corresponding to the information relating to the position and based on information serving as a reference for control, performs a conversion to distribute control energy to speed or position energy and force energy in accordance with a speed or position control function that is being realized as an action of the actuator, thereby converting real space information, in which a speed or position and a force are related to each other, to virtual space information, in which a speed or position and a force are independent of each other;
a position control amount calculator that calculates a speed or position control amount based on the speed or position energy distributed by the function-dependent force/speed distribution converter;
a force control amount calculator that calculates a force control amount based on the force energy distributed by the function-dependent force/speed distribution converter; and
an integrator that uses the speed or position control amount and the force control amount as an input and, in order to return a processing result thereof to the actuator, performs a reverse conversion on the speed or position control amount and the force control amount, from the virtual space information to the real space information, and determines an input to the actuator,
wherein the position/force controller controls the actuator based on the input to the actuator determined by the integrator, and
wherein the speed or position energy for controlling the actuator and the force energy for controlling the actuator are respectively separately controlled.
2. The position/force controller according to claim 1, wherein the function-dependent force/speed distribution converter selects any one of a plurality of speed or position control functions to be realized as an action of the actuator.
3. The position/force controller according to claim 1 or claim 2, wherein the function-dependent force/speed distribution converter distributes the control energy to the speed or position energy and the force energy by a coordinate conversion that represents the speed or position control function being realized as an action of the actuator.
4. The position/force controller according to claim 1, wherein the information serving as a reference for control includes information relating to a position based on an action of an actuator of another device, which information is inputted in real time.
5. The position/force controller according to claim 1, wherein the information serving as a reference for control includes information relating to a position based on an action of an actuator of another device, which information is acquired in advance.
6. The position/force controller according to claim 1, wherein the information serving as a reference for control includes information relating to a position based on an action of an actuator that is virtually created.
7. The position/force controller according to claim 6, wherein the information serving as a reference for control includes information relating to a position based on an action of an actuator that is virtually created by estimation of an action by a body in a virtual space of an electronic game.

8. The position/force controller according to claim 1, wherein the conversion performed by the function-dependent force/speed distribution converter includes a mirror conversion.

9. The position/force controller according to claim 8, wherein the conversion performed by the function-dependent force/speed distribution converter includes scaling of at least one of position and force.

10. The position/force controller according to claim 1, further comprising another actuator that is distinct from the actuator,
   wherein the actuator operates as one of a master device and a slave device, and the another actuator operates as the other of the master device and slave device, and
   wherein the master device and slave device are connected by wireless communications.

11. The position/force controller according to claim 1, further comprising a database in which computation details of the function-dependent force/speed distribution converter, the position control amount calculator and the force control amount calculator are accumulated for one or a plurality of object individuals.

12. The position/force controller according to claim 1, wherein the conversion performed by the function-dependent force/speed distribution converter includes an offset.

* * * * *